US010995227B2

(12) United States Patent
Suzuki et al.

(10) Patent No.: US 10,995,227 B2
(45) Date of Patent: May 4, 2021

(54) WATER-BASED INKJET INK

(71) Applicants: TOYO INK SC HOLDINGS CO., LTD., Tokyo (JP); TOYOCOLOR CO., LTD., Tokyo (JP)

(72) Inventors: Yoshihito Suzuki, Tokyo (JP); Masahiro Sugihara, Tokyo (JP); Masayoshi Utsugi, Tokyo (JP); Kazuhiro Jonai, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 356 days.

(21) Appl. No.: 16/084,563

(22) PCT Filed: Mar. 14, 2017

(86) PCT No.: PCT/JP2017/010214
§ 371 (c)(1),
(2) Date: Sep. 13, 2018

(87) PCT Pub. No.: WO2017/159685
PCT Pub. Date: Sep. 21, 2017

(65) Prior Publication Data
US 2019/0077978 A1 Mar. 14, 2019

(30) Foreign Application Priority Data
Mar. 14, 2016 (JP) .............. JP2016-049656

(51) Int. Cl.
*C09D 11/322* (2014.01)
*C09D 11/38* (2014.01)
*B41M 5/00* (2006.01)

(52) U.S. Cl.
CPC ............. *C09D 11/322* (2013.01); *B41M 5/00* (2013.01); *C09D 11/38* (2013.01)

(58) Field of Classification Search
None
See application file for complete search history.

(56) References Cited

U.S. PATENT DOCUMENTS

| | | | | |
|---|---|---|---|---|
| 10,208,217 B2* | 2/2019 | Takahashi | ............... | C09D 11/40 |
| 10,501,654 B2* | 12/2019 | Okamoto | ............. | C09D 11/322 |
| 2002/0077384 A1* | 6/2002 | Sano | ........ | C09D 11/32 523/160 |
| 2004/0024086 A1* | 2/2004 | Segawa | ................. | C09D 11/38 523/160 |
| 2005/0075449 A1 | 4/2005 | Kubota | | |
| 2007/0282033 A1 | 12/2007 | Ito et al. | | |
| 2008/0028980 A1 | 2/2008 | Aoki et al. | | |
| 2008/0118657 A1 | 5/2008 | Taverizatshy et al. | | |
| 2009/0181219 A1 | 7/2009 | Saito et al. | | |
| 2009/0196995 A1 | 8/2009 | Saito et al. | | |
| 2009/0258147 A1 | 10/2009 | Saito et al. | | |
| 2011/0236649 A1* | 9/2011 | Nishiki | .................. | C09D 11/38 428/195.1 |
| 2012/0306977 A1* | 12/2012 | Komatsu | .............. | C09D 11/322 347/100 |
| 2013/0183501 A1 | 7/2013 | Kasperchik et al. | | |
| 2014/0022321 A1* | 1/2014 | Komatsu | ................ | C09D 11/30 347/100 |
| 2014/0210918 A1 | 7/2014 | Kumagai et al. | | |
| 2014/0240393 A1 | 8/2014 | Mukai et al. | | |
| 2015/0175825 A1 | 6/2015 | Yamazaki et al. | | |
| 2015/0232694 A1 | 8/2015 | Okuyama | | |
| 2017/0369725 A1* | 12/2017 | Mitsuyoshi | .............. | B41M 5/00 |
| 2018/0237646 A1* | 8/2018 | Yoda | .................... | C09D 11/033 |
| 2019/0016911 A1* | 1/2019 | Okamoto | ................. | B41M 5/00 |

FOREIGN PATENT DOCUMENTS

| | | |
|---|---|---|
| DE | 102010018364 | 10/2011 |
| EP | 1153992 | 11/2001 |
| EP | 1754759 | 2/2007 |
| JP | 2001354888 | 12/2001 |
| JP | 2002356451 | 12/2002 |
| JP | 2004210996 | 7/2004 |
| JP | 2004339388 | 12/2004 |
| JP | 2008247941 | 10/2008 |
| JP | 2012211260 | 11/2012 |
| JP | 2012251047 | 12/2012 |
| JP | 2014145049 | 8/2014 |
| JP | 2014162819 | 9/2014 |
| JP | 2015124238 | 7/2015 |
| JP | 2015155494 | 8/2015 |
| JP | 2015183027 | 10/2015 |
| JP | 2016017126 | 2/2016 |

OTHER PUBLICATIONS

English translation of JP 2012/251047, Dec. 2012; 59 pages.*
"Office Action of Japan Counterpart Application", dated Jul. 16, 2019, with English translation thereof, p. 1-p. 5.
"Search Report of Europe Counterpart Application", dated Feb. 27, 2019, p. 1-p. 8.
"Office Action of Europe Counterpart Application,", dated Oct. 7, 2019, p. 1-p. 3.
"International Search Report (Form PCT/ISA/210) of PCT/JP2017/010214," dated May 16, 2017, with English translation thereof, pp. 1-4.
"Notification of Reasons for Refusal of Japanese Counterpart Application No. 2016-049656," dated Jan. 17, 2017, with English translation thereof, pp. 1-6.

* cited by examiner

*Primary Examiner* — Helene Klemanski
(74) *Attorney, Agent, or Firm* — JCIPRNET

(57) ABSTRACT

A water-based ink-jet which at least contains a pigment, a water-soluble organic solvent, and a surfactant (A), wherein the water-soluble organic solvent is a water-soluble organic solvent having an HLB value determined by Griffin's method of 8 or less, the water-soluble organic solvent being contained in an amount of 10-50 wt % with respect to the total weight of the water based ink-jet ink, and the surfactant (A) comprises an acetylenediol-based surfactant (a1) having an HLD value determined by Griffin's method of 3 or less.

10 Claims, No Drawings

WATER-BASED INKJET INK

CROSS-REFERENCE TO RELATED APPLICATION

This application is a 371 of international application of PCT application serial no. PCT/JP2017/010214, filed on Mar. 14, 2017, which claims the priority benefit of Japan application no. 2016-049656, filed on Mar. 14, 2016. The entirety of each of the abovementioned patent applications is hereby incorporated by reference herein and made a part of this specification.

TECHNICAL FIELD

The present disclosure relates to a water-based inkjet ink. More specifically, the present disclosure relates to a water-based inkjet ink which, during printing to printing substrates such as low-absorption substrates, is capable of forming high-quality printed items having no voids caused by unsatisfactory ink wetting properties and no color boundary bleeding or aggregation irregularities caused by coalescence of ink droplets of different hues, and which also exhibits excellent storage stability and excellent dischargeability from inkjet nozzles.

BACKGROUND ART

Unlike conventional plate-base printing such as offset printing, digital printing is a printing method that does not require a printing plate, and can therefore realize cost reductions and space-saving effects. Among the various digital printing methods, in the inkjet recording method, ink droplets are discharged from extremely fine nozzles and adhered directly to a recording member to form text and images. Using this type of recording method offers the advantages that the noise from the apparatus that is used is small, operation and color production is simple, and paper substrates can be used as the recording member. As a result, digital printing output devices are now widely used, not only in the office, but also in households.

Furthermore, as a result of improvements in inkjet technology, the use of digital printing output devices in industrial applications is expected to increase. In actual fact, devices for printing solvent inks and UV inks to plastic substrates such as polyvinyl chloride and PET are now commercially available. However, in recent years, consideration of potential harm to people and the environment, and countermeasures designed to address this harm, mean that restrictions on the use of solvents and monomers continue to be introduced. As a result, the demand for water-based inks is growing as a replacement for solvent inks and UV inks containing these types of restricted materials.

Conventionally, the development of water-based inks for inkjet printing has focused on water-based inks for printing to plain paper or specialty papers such as photographic glossy paper (see Patent Documents 1, 2 and 3). However, in recent years, there have been growing expectations of an expansion in the potential applications of the inkjet recording method, and there are growing needs for direct printing to low-absorption substrates such as art papers, coated papers and finely coated papers.

However, because the water that represents the main solvent of water-based inks has a high surface tension, water-based inks tend to exhibit poor wet spreadability on the above types of low-absorption substrates, as well as poor penetration into the substrates. Accordingly, when water-based inks are used for performing printing to low-absorption substrates, voids caused by unsatisfactory wet spreadability of the ink, and color boundary bleeding or aggregation irregularities caused by coalescence of undried ink droplets of different hues tend to occur more readily, resulting in a deterioration in image quality.

Generally, in order to improve the wet spreadability of an ink, a surfactant is used as one of the ink components. For example, Patent Document 4 discloses that when an ink containing a polyoxyethylene alkyl ether as a surfactant is used, image defects such as feathering are suppressed, the image quality is improved, and any deterioration in the dischargeability from the inkjet nozzles is also suppressed. When the ink disclosed in Patent Document 4 is used for printing to a substrate having superior water absorption such as 4200 paper manufactured by Xerox Corporation, a feathering suppression effect is achieved. However, when the above ink is used for printing to a low-absorption printing substrate (hereafter referred to as a low-absorption substrate) such as a coated paper, suppressing voids, color boundary bleeding and aggregation irregularities is difficult. It is thought that this is because even when the above surfactant is used, ensuring satisfactory wet spreading of the ink on low-absorption substrates is problematic, and because coalescence of ink droplets caused by unsatisfactory drying properties tends to occur readily.

As outlined above, conventional water-based inkjet inks cannot be said to be capable of forming high-quality printed items with no voids and no color boundary bleeding or aggregation irregularities, particularly when printing to low-absorption substrates, and moreover, do not exhibit excellent dischargeability from inkjet nozzles.

PRIOR ART DOCUMENTS

Patent Documents

Patent Document 1: JP 2001-354888 A
Patent Document 2: JP 2004-210996 A
Patent Document 3: JP 2008-247941 A
Patent Document 4: JP 2012-211260 A

SUMMARY OF THE INVENTION

Problems to be Solved by the Invention

The present invention has been developed in light of the circumstances described above, and has an object of providing a water-based inkjet ink which, during printing to printing substrates such as low-absorption substrates, is capable of forming high-quality printed items having no voids caused by unsatisfactory ink wetting properties and no color boundary bleeding or aggregation irregularities caused by coalescence of ink droplets of different hues, and which also exhibits excellent storage stability and excellent dischargeability from inkjet nozzles.

Means to Solve the Problems

As a result of intensive research relating to the constituent components of water-based inkjet inks, the inventors of the present invention discovered that by using a combination of an organic solvent and a surfactant each having a specific HLB value, the object described above could be achieved, and they were therefore able to complete the present invention.

In other words, one aspect of the present invention relates to a water-based inkjet ink. This water-based inkjet ink contains at least a pigment, a water-soluble organic solvent and a surfactant (A), wherein the water-soluble organic solvent is a water-soluble organic solvent having an HLB value determined by Griffin's method of 8 or less, which is included in an amount within a range from 10% by weight to 50% by weight relative to the total weight of the water-based inkjet ink, and the surfactant (A) contains an acetylenediol-based surfactant (a1) having an HLB value determined by Griffin's method of 3 or less.

In one embodiment, the surfactant (A) preferably also contains a polysiloxane-based surfactant (a2) having an HLB value determined by Griffin's method of 4 or less.

In one embodiment, the surfactant (A) preferably also contains a polysiloxane-based surfactant (a3) having an HLB value determined by Griffin's method of 8 to 20.

In one embodiment, the polysiloxane-based surfactant (a3) having an HLB value determined by Griffin's method of at least 8 but not more than 20 preferably contains a compound represented by the formula shown below.

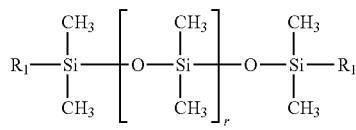

[In the formula, r represents an integer of 1 to 80, and $R_1$ is a group represented by the formula shown below.

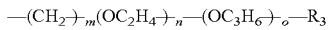

(In the formula, m represents an integer of 1 to 6, n represents an integer of 0 to 50, o represents an integer of 0 to 50, n+o is an integer of 1 or greater, and $R_3$ represents a hydrogen atom, an alkyl group of 1 to 6 carbon atoms, or a (meth)acrylic group.)]

In one embodiment, the amount of the acetylenediol-based surfactant (a1) having an HLB value of 3 or less is preferably within a range from 0.25% by weight to 5.0% by weight relative to the total weight of the water-based inkjet ink.

In one embodiment, the ratio between the amount of the polysiloxane-based surfactant (a2) having an HLB value of 4 or less and the amount of the acetylenediol-based surfactant (a1) having an HLB value of 3 or less, namely the ratio (a2):(a1), is preferably from 0.1:1.0 to 4.0:1.0.

In one embodiment, the ratio between the amount of the polysiloxane-based surfactant (a3) having an HLB value of at least 8 but not more than 20 and the amount of the acetylenediol-based surfactant (a1) having an HLB value of 3 or less, namely the ratio (a3):(a1), is preferably from 0.05:1.0 to 2.5:1.0.

In one embodiment, the water-soluble organic solvent having an HLB value of 8 or less preferably contains a polyol-based solvent.

In one embodiment, the water-based inkjet ink preferably also contains a water-soluble resin having an acid value of 1 to 80 mgKOH/g.

In one embodiment, the amount of the water-soluble resin is preferably within a range from 0.25% by weight to 15% by weight relative to the total weight of the water-based inkjet ink.

A second aspect of the present invention relates to a printed item having a printing substrate, and a coating film formed using the above water-based inkjet ink on the printing substrate.

Effects of the Invention

The present invention is able to provide a water-based inkjet ink which, during printing to printing substrates such as low-absorption substrates, is capable of forming high-quality printed items having no voids caused by unsatisfactory ink wetting properties and no color boundary bleeding or aggregation irregularities caused by coalescence of ink droplets of different hues, and which also exhibits excellent storage stability and excellent dischargeability from inkjet nozzles.

The disclosure of this application is related to the subject matter disclosed in prior Japanese Application 2016-049656 filed on Mar. 14, 2016, the entire contents of which are incorporated herein by reference.

EMBODIMENTS FOR CARRYING OUT THE INVENTION

Preferred embodiments of the present invention are described below in detail. However, the present invention is in no way limited by the following embodiments, and also includes modifications that can be made without altering the scope of the present invention. Further, unless specifically stated otherwise, "parts" and "%" represent "parts by weight" and "% by weight" respectively.

As mentioned above, water, which represents the main solvent of the water-based inkjet ink (hereafter also referred to as simply "the ink"), has a high surface tension. As a result, the ink tends to exhibit poor wet spreadability on the printing substrate, and tends to be prone to voids, color boundary bleeding and aggregation irregularities that can cause a deterioration in image quality.

Reducing the surface tension of the ink is effective in improving the image quality. Accordingly, the surface tension of the ink is typically reduced by using a surfactant and a hydrophobic water-soluble solvent as components of the ink. However, a satisfactory improvement in the image quality cannot be obtained simply by reducing the ink surface tension. In other words, if ink droplets that have undergone wet spreading coalesce with one another, then color boundary bleeding and aggregation irregularities tend to occur, and if these phenomena are not suppressed, then improvements in the image quality cannot be achieved. Further, if the aforementioned surfactant or hydrophobic water-soluble solvent is used in excess, then other problems tend to occur more readily. For example, the pigment in the ink tends to aggregate more easily, meaning the storage stability of the ink deteriorates. Further, ink leakage from the inkjet nozzles also tends to occur more easily, causing a deterioration in the discharge properties.

As a result of intensive investigation aimed at addressing the above problems, the inventors of the present invention discovered that the problems could be resolved by using a combination of an organic solvent and a surfactant each having a specific HLB value.

In one embodiment, the water-based inkjet ink contains a pigment, a water-soluble organic solvent and a surfactant (A), wherein a water-soluble organic solvent having an HLB value determined by Griffin's method of 8 or less is used as the water-soluble organic solvent, and an acetylenediol-based surfactant (a1) having an HLB value determined by Griffin's method of 3 or less is used as the surfactant (A).

The HLB (Hydrophile-Lipophile Balance) value is one parameter that indicates the hydrophilicity and hydrophobicity of a material. There are various methods for calculating the HLB value, including Griffin's method, Davies' method and the Kawakami method, but in the present invention, HLB calculations are performed using Griffin's method.

Griffin's method is generally known for use with nonionic materials, and yields a value that indicates the degree of hydrophilicity or hydrophobicity of the material, and is determined using the molecular weight of the target material, in accordance with formula (1) shown below. The smaller the HLB value, the higher the hydrophobicity of the material, whereas the larger the HLB value, the higher the hydrophilicity. Generally, from the viewpoint of the hydrophobicity, it is recognized that an HLB value of 3 or less represents high hydrophobicity, an HLB value of 3 to 8 represents a medium level of hydrophobicity, and an HLB value of 8 or greater represents low hydrophobicity.

$$\text{HLB value} = 20 \times (\text{sum of molecular weights of hydrophilic portions}) \div (\text{molecular weight of material}) \quad \text{Formula (1)}$$

The "HLB value" described in the present description means the HLB value calculated using Griffin's method described above in those cases where the structure of the compound being used is clearly understood. On the other hand, in the case of a compound in which the structure is unclear, the HLB value can be determined experimentally, for example using the method disclosed on page 324 of "The Surfactant Handbook" (edited by Ichiro Nishi et al., Sangyo-Tosho Publishing Co. Ltd., 1960). Specifically, 0.5 g of the surfactant is first dissolved in 5 mL of ethanol. Then, with the solution undergoing stirring at a temperature of 25° C., a titration is performed with a 2% by weight aqueous solution of phenol, with the point where cloudiness of the solution is confirmed being deemed the end point. If the amount of the aqueous solution of phenol required to reach the end point is termed A (mL), then the HLB value can be calculated in accordance with the following formula (2).

$$\text{HLB value} = 0.89 \times A + 1.11 \quad \text{Formula (2)}$$

It is thought that the acetylenediol-based surfactant (a1) having an HLB value of 3 or less orients at the surface of the ink droplets within an extremely short period of time of not more than several tens of microseconds from the point when the ink impacts the printing substrate, thereby dramatically improving the ink wetting properties and enabling suppression of coalescence of the ink droplets in the initial period immediately following ink impact. Further, the surfactant (a1) allows the ink droplets to undergo rapid wet spreading that yields an increase in surface area, thereby improving the efficiency of the drying process and the penetration into the substrate, and it is thought that this also contributes to better suppression of coalescence of the ink droplets.

On the other hand, when an ink is produced using a material having the type of small HLB value described above (namely, a material having high hydrophobicity), problems such as phase separation over time, and a deterioration in storage stability due to the effects on other materials tend to occur more readily. However, the inventors of the present invention discovered that by also adding a certain amount of a water-soluble organic solvent having an HLB value of 8 or less as another ink component, these types of problems could be resolved. In other words, when a combination of the acetylenediol-based surfactant (a1) having a high hydrophobicity and a water-soluble organic solvent having a medium level of hydrophobicity is used, the acetylenediol-based surfactant (a1) remains compatible with the other ink components, and exists in a stable manner without separation. Further, the effects on other ink components can also be suppressed to a minimum. It is thought that, as a result, improvements in the storage stability and the dischargeability can be achieved.

As described above, by using a water-based inkjet ink that uses a combination of a water-soluble organic solvent and a surfactant each having a specific HLB value, the problems of voids, color boundary bleeding and aggregation irregularities are all improved, high-quality printed items can be formed, and excellent storage stability and dischargeability can be achieved. The mechanism described above is merely a hypothesis, and in no way limits the present invention. The main components of the water-based inkjet ink are described below.

<Surfactant (A)>
<Acetylenediol-Based Surfactant (a1)>

In one embodiment, the water-based inkjet ink contains a specific acetylenediol-based surfactant (a1) having an HLB value determined by Griffin's method of 3 or less as the surfactant (A). The HLB value of the acetylenediol-based surfactant (a1) is preferably at least 1.0 but not more than 2.9, more preferably at least 2.0 but not more than 2.8, and even more preferably at least 2.2 but not more than 2.7.

As mentioned above, it is thought that the acetylenediol-based surfactant (a1) having an HLB value of 3 or less exhibits excellent speed of orientation to the surface of the ink droplets, thereby improving the wetting properties and enabling coalescence of the liquid droplets to be better suppressed. Further, by using the surfactant (a1) in combination with the water-soluble organic solvent having an HLB value of 8 or less described below, the storage stability and dischargeability of the ink can be maintained at favorable levels.

The amount of the acetylenediol-based surfactant (a1) having an HLB value of 3 or less is preferably at least 0.25% by weight but not more than 5.0% by weight relative to the total weight of the ink. In one embodiment, this amount is preferably at least 0.5% by weight but not more than 5.0% by weight, more preferably at least 0.7% by weight but not more than 4% by weight, and even more preferably at least 1.0% by weight but not more than 3.0% by weight. When the amount is at least 0.5% by weight, the surfactant function is able to manifest satisfactorily. Further, when the amount is not more than 5.0% by weight, the storage stability and dischargeability of the ink can be maintained at favorable levels.

Specific examples of the acetylenediol-based surfactant (a1) having an HLB value of 3 or less include 2,4,7,9-tetramethyl-5-decyne-4,7-diol, 2,5,8,11-tetramethyl-6-dodecyne-5,8-diol, hexadec-8-yne-7,10-diol, 7,10-dimethylhexadec-8-yne-7,10-diol, 4,7-dipropyldec-5-yne-4,7-diol, 6,9-dimethyltetradec-7-yne-6,9-diol, 3,6-diisopropyl-2,7-dimethyloct-4-yne-3,6-diol, octadec-9-yne-8,11-diol, 7,10-dimethylhexadec-8-yne-7,10-diol, 5,8-dibutyldodec-6-yne-5,8-diol, 4,7-diisobutyl-2,9-dimethyldec-5-yne-4,7-diol, and 5,14-diethyl-8,11-dimethyloctadec-9-yne-8,11-diol.

For the acetylenediol-based surfactant (a1), one of the above compounds may be used alone, or a combination of two or more compounds may be used. In one embodiment, from the viewpoint of compatibility with the water-based inkjet ink, at least one compound selected from the group consisting of 2,5,8,11-tetramethyl-6-dodecyne-5,8-diol, hexadec-8-yne-7,10-diol, 6,9-dimethyltetradec-7-yne-6,9- diol, 4,7-dipropyldec-5-yne-4,7-diol, 7,10-dimethylhexadec-8-yne-7,10-diol and 2,4,7,9-tetramethyl-5-decyne-4,7-diol is preferred.

The above compounds may be synthesized using conventional synthesis methods, or commercially available products may be used. An example of a synthesis method that may be used for the acetylenediol-based surfactant (a1) is the method disclosed in Example 1 described in JP 2002-356451 A.

<Polysiloxane-Based Surfactants>

In one embodiment, the surfactant (A) preferably contains a polysiloxane-based surfactant in addition to the acetylenediol-based surfactant (a1) having an HLB value of 3 or less. Compared with acetylenediol-based surfactants, polysiloxane-based surfactants are generally slower to orient at the liquid surface. Accordingly, by using a combination of both types of surfactant, color boundary bleeding and aggregation irregularities are able to be further improved. Further, using a polysiloxane-based surfactant is also preferred in terms of making it easier to impart the printed items with water repellency and abrasion resistance, and facilitating control of the surface tension and dischargeability of the ink.

In one embodiment, a combination of the acetylenediol-based surfactant (a1) having an HLB value of 3 or less, and at least one surfactant selected from the group consisting of polysiloxane-based surfactants (a2) having an HLB value of 4 or less and polysiloxane-based surfactants (a3) having an HLB value of at least 8 but not more than 20 is preferably used as the surfactant (A). The HLB values of the polysiloxane-based surfactants (a2) and (a3) are also calculated using Griffin's method.

The polysiloxane-based surfactant (a2) having an HLB value of 4 or less orients quickly within the ink compared with most polysiloxane-based surfactants, and exhibits excellent functionality in terms of lowering the surface tension, and therefore has the effect of improving the wetting properties of the ink. On the other hand, the polysiloxane-based surfactant (a3) having an HLB value of at least 8 but not more than 20 has a particularly powerful effect in suppressing coalescence of the ink droplets compared with the acetylenediol-based surfactant (a1) having an HLB value of 3 or less and the polysiloxane-based surfactant (a2) having an HLB value of 4 or less. Accordingly, in one embodiment, the surfactant (A) preferably contains both the polysiloxane-based surfactant (a2) having an HLB value of 4 or less and the polysiloxane-based surfactant (a3) having an HLB value of at least 8 but not more than 20, in addition to the acetylenediol-based surfactant (a1).

The polysiloxane-based surfactants (a2) and (a3) described above may be compounds represented by general formula (2) shown below or general formula (4) shown below.

General formula (2)

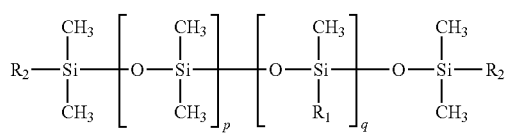

In general formula (2), p represents an integer of 0 or greater, and q represents an integer of 1 or greater. Further, $R_1$ represents a group represented by general formula (3) shown below, and $R_2$ represents an alkyl group of 1 to 6 carbon atoms.

General formula (3)

In general formula (3), m represents an integer of 1 to 6, n represents an integer of 0 to 50, o represents an integer of 0 to 50, an n+o represents an integer of 1 or greater. $R_3$ represents a hydrogen atom, an alkyl group of 1 to 6 carbon atoms, or a (meth)acrylic group.

General formula (4)

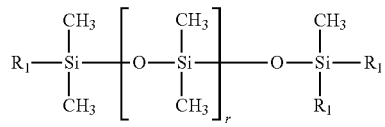

In general formula (4), r represents an integer of 1 to 80. $R_1$ is a group represented by general formula (3) above.

Compounds represented by the above general formula (2) contribute significantly to altering the surface tension, the wetting properties and the discharge properties of the ink. Further, compounds represented by the above general formula (4) have the effect of increasing the suppression of coalescence of ink droplets on the substrate and improving the ink storage stability (the stability of the surface tension). Accordingly, the compounds used as the surfactant (A) may be selected appropriately from among the range of compounds represented by the above general formula (2) and general formula (4) with due consideration of the HLB values.

The compounds represented by the above general formula (2) or (4) that may be used as the polysiloxane-based surfactants may be synthesized using conventional synthesis methods, or may be commercially available products.

Examples of commercially available products represented by the above general formula (2) include SF8428, FZ-2162, 8032 Additive, SH3749, FZ-77, L-7001, L-7002, FZ-2104, FZ-2110, F-2123, SH8400 and SH3773M manufactured by Dow Corning Toray Co., Ltd.; BYK-345, BYK-346, BYK-347, BYK-348 and BYK-349 manufactured by BYK Chemie GmbH; TEGO Wet 250, TEGO Wet 260, TEGO Wet 270 and TEGO Wet 280 manufactured by Evonik Degussa GmbH; KF-351A, KF-352A, KF-353, KF-354L, KF-355A, KF-615A, KF-640, KF-642 and KF-643 manufactured by Shin-Etsu Chemical Co., Ltd.; and the SILFACE SAG series manufactured by Nissin Chemical Industry Co., Ltd.

Further, examples of commercially available products represented by the above general formula (4) include BY16-201 and SF8427 manufactured by Dow Corning Toray Co., Ltd.; BYK-331, BYK-333 and BYK-UV3500 manufactured by BYK Chemie GmbH; and TEGO Glide 410, TEGO Glide 432, TEGO Glide 435, TEGO Glide 440 and TEGO Glide 450 manufactured by Evonik Degussa GmbH.

<Polysiloxane-Based Surfactant (a2) Having HLB Value of 4 or Less>

As mentioned above, the polysiloxane-based surfactant (a2) having an HLB value of 4 or less contributes mainly to the ink wetting properties, and the HLB value of the surfactant (a2) is preferably at least 2.0 but not more than 3.8, and more preferably at least 2.4 but not more than 3.6.

The amount of the polysiloxane-based surfactant (a2) having an HLB value of 4 or less is preferably at least 0.1% by weight, and more preferably at least 0.2% by weight, relative to the total weight of the ink. On the other hand, the amount is preferably not more than 4.0% by weight, and more preferably 3.5% by weight or less. In one embodiment, the amount is preferably at least 0.1% by weight but not more than 4.0% by weight, more preferably at least 0.5% by weight but not more than 3.0% by weight, and even more preferably at least 1.0% by weight but not more than 2.5% by weight. By adjusting the amount to fall within the above range, an ink having excellent wetting properties relative to the substrate, and also exhibiting excellent dischargeability and storage stability can be more easily obtained.

Further, the ratio of the amount of the polysiloxane-based surfactant (a2) having an HLB value of 4 or less relative to a value of 1 for the amount of the acetylenediol-based surfactant (a1) having an HLB value of 3 or less, namely the weight ratio of (a2)/(a1), is preferably at least 0.1, and more preferably 0.2 or greater. On the other hand, this weight ratio is preferably not more than 4.0, and more preferably 3.5 or less.

In one embodiment, the above weight ratio is preferably from 0.2 to 3.3, more preferably from 0.4 to 2.5, and particularly preferably from 0.5 to 1.5. Generally, when a combination of a plurality of surfactants is used, it is thought that the compatibility of each surfactant with the other ink components varies. It is thought that by adjusting the ratio of the above amounts to fall within the above range, the compatibility of each of the surfactants can be more easily assured.

As described above, the polysiloxane-based surfactant (a2) having an HLB value of 4 or less is a material that contributes to the wetting properties of the ink, and a surfactant having a structure represented by the above general formula (2), which contributes significantly to the ink surface tension, is particularly preferred. Although not a particular restriction, the products TEGO Wet 270 and TEGO Wet 280 listed among the above commercially available products can be used particularly favorably.

<Polysiloxane-Based Surfactant (a3) Having HLB Value of at Least 8 but Not More Than 20>

The polysiloxane-based surfactant (a3) having an HLB value of at least 8 but not more than 20 is used mainly for suppressing coalescence of the ink droplets on the substrate. The HLB value of the surfactant (a3) is preferably at least 10 but not more than 18, and more preferably at least 12 but not more than 16.

The amount of the polysiloxane-based surfactant (a3) having an HLB value of at least 8 but not more than 20, relative to the total weight of the ink, is preferably at least 0.05% by weight but not more than 1.0% by weight, more preferably at least 0.1% by weight but not more than 0.8% by weight, and even more preferably at least 0.2% by weight but not more than 0.7% by weight. By ensuring that the amount falls within the above range, coalescence of ink droplets on the substrate is less likely to occur, and an ink having excellent storage stability and dischargeability can be more easily obtained.

The weight ratio of the amount of the polysiloxane-based surfactant (a3) having an HLB value of at least 8 but not more than 20 relative to a value of 1 for the amount of the acetylenediol-based surfactant (a1) having an HLB value of 3 or less, namely the value of (a3)/(a1), is preferably at least 0.05, and more preferably 0.1 or greater. On the other hand, this weight ratio is preferably not more than 2.5, and more preferably 2.0 or less. In one embodiment, the above weight ratio is preferably from 0.1 to 2.0, more preferably from 0.15 to 1.5, and even more preferably from 0.2 to 1.0. It is thought that by adjusting the weight ratio of the above amounts to fall within the above range, the compatibility of each of the surfactants can be more easily assured.

As described above, the polysiloxane-based surfactant (a3) having an HLB value of at least 8 but not more than 20 is a material that contributes to the suppression of coalescence of ink droplets on the substrate, and a surfactant having a structure represented by the above general formula (4) is particularly preferred. Although not a particular restriction, the products TEGO Glide 440 and BYK-UV3500 listed among the above commercially available products can be used particularly favorably.

<Other Surfactants>

In one embodiment, one or more surfactants besides the surfactants (a1) to (a3) described above may also be used in combination with the above surfactants, provided the various effects described above are not impaired. Numerous other known surfactants may be used in accordance with the intended purpose. Among these other surfactants, from the viewpoints of maintaining the surface tension of the ink in a favorable state and ensuring favorable wetting properties and discharge properties, and also in terms of enabling stable existence with the hydrophilic ink materials, an acetylene-based surfactant other than the above surfactant (a1) may be used favorably. Moreover, glycol ether-based surfactants and fluorine-based surfactants and the like may also be used.

<Water-Soluble Organic Solvent>

In one embodiment, the water-based inkjet ink contains a water-soluble organic solvent having an HLB value of 8 or less in an amount within a range from 10% by weight to 50% by weight relative to the total weight of the water-based inkjet ink. It is thought that the water-soluble organic solvent having an HLB value of 8 or less has a function of improving the compatibility with water of the surfactants having a small HLB value that are also used in the ink. Accordingly, provided the hydrophilicity is not impaired, the use of a water-soluble organic solvent having a small HLB value is preferred. Specifically, the HLB value of the water-soluble organic solvent is preferably at least 1 but not more than 7.8, and is particularly preferably at least 2 but not more than 7.6. The HLB value of the water-soluble organic solvent is also measured using Griffin's method.

The boiling point of the water-soluble organic solvent that is used, at one atmosphere, is preferably at least 180° C. but not more than 250° C., and more preferably at least 180° C. but not more than 230° C. When a water-soluble organic solvent having a boiling point of at least 180° C. is used, drying of the ink that contacts the outside air on the nozzle interface of the inkjet head can be suppressed, making it easier to improve the discharge stability of the ink. On the other hand, when a water-soluble organic solvent having a boiling point of not more than 250° C. is used, favorable drying properties on the printing substrate can be maintained, while any deterioration in image quality due to color boundary bleeding and aggregation irregularities can be better suppressed.

Specific examples of water-soluble organic solvents having an HLB value of 8 or less include polyol-based solvents such as 1,2-butanediol, 1,3-butanediol, 1,4-butanediol, 2-methyl-1,3-propanediol, 3-methyl-1,3-butanediol, 1,2-pentandiol, 1,5-pentanediol, 2,2-dimethyl-1,3-propanediol, 3-methyl-1,5-pentanediol 1,2-hexanediol and 1,6-hexanediol;

propylene glycol monoether-based solvents such as propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether;

propylene glycol diether-based solvents such as propylene glycol dimethyl ether, dipropylene glycol dimethyl ether and tripropylene glycol dimethyl ether; and methoxybutanol-based solvents such as 3-methoxy-1-butanol and 3-methoxy-3-methylbutanol. One of these solvents may be used alone, or a combination of two or more solvents may be used.

Among the above specific examples, examples of solvents having a boiling point at one atmosphere of at least 180° C. but not more than 250° C. include 1,2-butanediol, 1,3-butanediol, 1,4-butanediol, 2-methyl-1,3-propanediol, 3-methyl-1,3-butanediol, 1,2-pentanediol, 1,5-pentanediol, 2,2-dimethyl-1,3-propanediol, 3-methyl-1,5-pentanediol, 1,2-hexanediol, 1,6-hexanediol, dipropylene glycol monomethyl ether, dipropylene glycol monoethyl ether, dipropylene glycol monopropyl ether, dipropylene glycol monobutyl ether, and tripropylene glycol monomethyl ether. The use of either one of these solvents, or a combination of two or more of these solvents, is particularly preferred.

In one embodiment, the water-soluble organic solvent is preferably at least one solvent selected from the group consisting of 1,2-butanediol, 1,3-butanediol, 1,2-pentanediol, 1,2-hexanediol, dipropylene glycol, 3-methoxy-1-butanol and propylene glycol monomethyl ether.

In one embodiment, selection of a polyol-based solvent as the water-soluble organic solvent is particularly preferred. Inks that use a polyol-based solvent having an HLB value of 8 or less tend to exhibit particularly superior storage stability and discharge properties compared with inks that use a water-soluble organic solvent having an HLB value 8 or less other than a polyol-based solvent. Although only conjecture, it is thought that because polyol-based solvents have a plurality of hydroxyl groups, there is a possibility of the formation of hydrogen bonds with the hydroxyl groups of the acetylenediol-based surfactant or the oxygen atoms of the polysiloxane-based surfactants, thereby further enhancing the compatibility effect between the above surfactants and water.

Moreover, in one embodiment, the use of a 1,2-alkanediol as the above polyol-based solvent is the most desirable. In a 1,2-alkanediol, the hydroxyl groups that represent the hydrophilic units and the alkyl group that represents the hydrophobic unit are localized, meaning that while good affinity with water can be achieved, the surface tension of the ink can also be lowered into the favorable range. It is thought that, as a result, the ink wetting properties can be improved, and printed items having excellent image quality can be more easily obtained. For these types of reasons, the most preferred solvents among the compounds listed above are 1,2-alkanediols having an HLB value of 8 or less. Specific examples of such solvents include 1,2-butanediol, 1,2-pentanediol and 1,2-hexanediol.

In one embodiment, the amount of the water-soluble organic solvent having an HLB value of 8 or less is at least 10% by weight but not more than 50% by weight relative to the total weight of the ink. This amount is preferably at least 15% by weight but not more than 40% by weight, and more preferably at least 20% by weight but not more than 30% by weight. When the amount is at least 10% by weight, satisfactory compatibility can be achieved for surfactants having a small HLB value, and favorable storage stability and dischargeability can be more easily ensured. Further, when the amount is not more than 50% by weight, the ink viscosity can be kept within a favorable range, and favorable dischargeability can be more easily obtained.

Furthermore, because the water-soluble organic solvent having an HLB value of 8 or less functions as a compatibilizer for the acetylenediol-based surfactant (a1) having an HLB value of 3 or less, it is preferable that the ratio between the amounts of these two components is adjusted appropriately. In one embodiment, the amount of the water-soluble organic solvent having an HLB value of 8 or less, relative to a value of 1 for the amount of the acetylenediol-based surfactant (a1) having an HLB value of 3 or less, is preferably from 5 to 100, more preferably from 10 to 70, and particularly preferably from 15 to 40. When the ratio between the amounts of these two components is adjusted to a value within the above range, the acetylenediol-based surfactant (a1) having an HLB value of 3 or less can be dissolved favorably, and a uniform ink can be more easily obtained.

In one embodiment, water-soluble organic solvents other than those described above may also be used, either individually or in combinations containing a plurality of solvents, as the water-soluble organic solvent. However, the amounts of such solvents are preferably adjusted to ensure no deterioration in the desired effects.

Specific examples of these water-soluble organic solvents other than those described above include, but are not limited to, ethylene glycol monoethyl ether, ethylene glycol monobutyl ether, ethylene glycol 2-ethylhexyl ether, diethylene glycol monoethyl ether, diethylene glycol monopropyl ether, diethylene glycol monobutyl ether, diethylene glycol monopentyl ether, diethylene glycol monohexyl ether, diethylene glycol methyl ethyl ether, diethylene glycol methyl butyl ether, triethylene glycol monomethyl ether, triethylene glycol monoethyl ether, triethylene glycol monopropyl ether, triethylene glycol monobutyl ether, triethylene glycol methyl ethyl ether, triethylene glycol methyl butyl ether, diethylene glycol diethyl ether, triethylene glycol diethyl ether, tetraethylene glycol dimethyl ether, tetraethylene glycol diethyl ether, tetraethylene glycol methyl ethyl ether, tetraethylene glycol methyl butyl ether, glycerol, 2-pyrrolidone, N-methyloxazolidinone, γ-butyrolactone and ε-caprolactone.

<Binder Resin>

In one embodiment, from the viewpoint of improving the coating film durability of the printed items, the water-based inkjet ink preferably contains a binder resin. Typically known binder resins used in inkjet inks include resin microparticles and water-soluble resins.

(Resin Microparticles)

Resin microparticles have a higher molecular weight than water-soluble resins, and can lower the ink viscosity, meaning a larger amount of the resin can be included in the ink, and as a result, resin microparticles are ideal for enhancing the durability of the printed items. Examples of the types of resins that can be used for forming the resin microparticles include acrylic-based resins, styrene/acrylic-based resins, urethane-based resins, styrene/butadiene-based resins, vinyl chloride-based resins and polyolefin-based resins. Among these, if consideration is given to the storage stability of the ink and the durability of the printed items, then resin microparticles formed from acrylic-based resins and/or styrene/acrylic-based microparticles can be used particularly favorably.

However, when resin microparticles are used as the binder resin, consideration must be given to the minimum film forming temperature (MFT) of the resin microparticles. When resin microparticles having a low MFT are used, the MFT of the resin microparticles tends to decrease further due to the effects of the water-soluble organic solvent added to the ink. As a result, fusion and aggregation of the microparticles can occur even at room temperature, resulting in an increased likelihood of blockages of the inkjet head nozzles. Furthermore, when resin microparticles are used as the binder resin, once film formation has occurred, the resin microparticles do not redissolve in the ink, and the resulting solidified resin component can sometimes cause a deterioration in the discharge properties. In order to avoid these types of problems, it is preferable that the MFT of the resin microparticles is adjusted to a value of at least 60° C. by appropriate selection of the monomers that constitute the resin microparticles and the amounts of those monomers. The MFT value can be measured, for example, using an MFT Tester manufactured by Tester Sangyo Co., Ltd.

(Water-Soluble Resin)

On the other hand, unlike resin microparticles, water-soluble resins themselves exhibit solubility. Accordingly, inks that contain a water-soluble resin as a binder resin do not suffer from instant precipitation or film formation of the resin component when used with a water-soluble organic solvent having high hydrophobicity (namely a small HLB value) or if water volatilizes from the ink at the air-liquid interface. As a result, blockages of the inkjet head nozzles are unlikely to occur, and it becomes easier to achieve excellent discharge properties. Further, in one embodiment, by appropriate selection of the constituent materials for the water-soluble resin, the resin is able to also function as a compatibilizer for the surfactants having a small HLB value. For the above reasons, the use of a water-soluble resin as the binder resin is preferred.

Among the various water-soluble resins, those having an alkyl chain (alkyl group) that acts as a hydrophobic unit within the molecule are preferred. In one embodiment, the water-soluble resin preferably has an alkyl group of 8 to 36 carbon atoms. A water-soluble resin having a hydrophobic unit containing such an alkyl group can function as a compatibilizer for the above types of surfactants having a small HLB value, and therefore by using such a water-soluble resin, the image quality during printing and the storage stability of the ink can be further improved.

The alkyl group within the molecule of the water-soluble resin may have a linear structure, a branched structure or a cyclic structure, but preferably has a linear structure. The number of carbon atoms in the alkyl group is preferably at least 8, more preferably at least 10, and even more preferably 12 or greater. On the other hand, the number of carbon atoms in the alkyl group is preferably not more than 30, more preferably not more than 26, and in order of increasing preference, is even more preferably not more than 24 or not more than 22. In one embodiment, the alkyl group preferably contains 10 to 30 carbon atoms, more preferably 12 to 26 carbon atoms, and even more preferably 18 to 24 carbon atoms.

Examples of linear alkyl groups include an octyl group (C8), nonyl group (C9), decyl group (C10), lauryl group (C12), myristyl group (C14), cetyl group (C16), stearyl group (C18), arachidyl group (C20), behenyl group (C22), lignoceryl group (C24), cerotoyl group (C26), montanyl group (C28), melissyl group (C30), dotriacontanyl group (C32), tetratriacontanyl group (C34), and hexatriacontanyl group (C36).

Examples of the types of water-soluble resins having these alkyl groups include acrylic-based resins, styrene/acrylic-based resins, urethane-based resins and polyolefin-based resins. Among these, if consideration is also given to the durability of the printed items as well as the storage stability of the ink, then in a similar manner to that described for the resin microparticles, acrylic-based and styrene/acrylic-based water-soluble resins can be used particularly favorably. In the present invention, resins synthesized by conventional synthesis methods may be used as the water-soluble resin, or a commercially available product may be used. Further, there are no particular limitations on the structure of the resin, and water-soluble resins having various structures such as random structures, block structures, comb-like structures and star-like structures may be used as desired.

In one embodiment, the water-soluble resin may be a copolymer of styrene, (meth)acrylic acid, and an alkyl (meth)acrylate ester. By adjusting the number of carbon atoms in the alkyl group of the (meth)acrylate ester, a water-soluble resin having the desired alkyl groups of 8 to 36 carbon atoms within the molecule can be formed.

Although not a particular limitation, in one embodiment, the blend ratio (weight ratio) of styrene:(meth)acrylic acid:(meth)acrylate ester is preferably within a range from (0 to 35):(0.5 to 15):(50 to 99.5) (provided that the total is 100). This blend ratio is more preferably within a range from (4 to 20):(1 to 10):(70 to 95).

In those cases where a water-soluble resin is used as the binder resin, the weight average molecular weight (Mw) of the water-soluble resin is preferably within a range from at least 5,000 to not more than 50,000, more preferably within a range from at least 7,500 to not more than 30,000, and particularly preferably within a range from at least 10,000 to not more than 20,000. When the weight average molecular weight is adjusted to a value of at least 5,000, better coating film durability can be more easily obtained in the printed items. Further, when the weight average molecular weight is not more than 50,000, the discharge stability from the inkjet head can be more easily maintained at a favorable level.

Further, in those cases where a water-soluble resin is used as the binder resin, the width of the molecular weight distribution for the water-soluble resin is preferably narrow. If the molecular weight distribution width for the water-soluble resin is broad, then the proportion of high-molecular weight components and low-molecular weight components that may have adverse effects on the print quality increases. For example, increases in the ink viscosity, discharge delays and voids caused by high-molecular weight components, or worsening of the coating film durability caused by low-molecular weight components become more likely. Accordingly, by using a water-soluble resin with a narrow molecular weight distribution width, any deterioration in the print quality can be suppressed.

In one embodiment, a water-soluble resin having a molecular weight distribution width, represented by a ratio (Mw/Mn) of the weight average molecular weight (Mw) relative to the number average molecular weight (Mn), that is within a range from 1.0 to 2.5 is preferably used as the binder resin. The molecular weight distribution width of the water-soluble resin is more preferably from 1.0 to 2.0. When the molecular weight distribution width is adjusted to a value within this range, the discharge stability can be more easily improved, including during the initial stages of printing. Further, superior image quality and excellent coating film durability can be more easily obtained during printing.

This is because as the molecular weight distribution width of the binder resin represented by Mw/Mn is narrowed, the amounts of high-molecular weight components and low-molecular weight components is reduced. In other words, it is thought that by using a water-soluble resin having a narrow molecular weight distribution width, and therefore containing a small amount of high-molecular weight components, any increase in the ink viscosity at the air-liquid interface can be better suppressed, even when the resin is used in combination with a water-soluble organic solvent having an HLB value of 8 or less. In this manner, by using a water-soluble resin having a molecular weight distribution width within the above range, the occurrence of discharge delays can be suppressed, and the discharge properties can be further enhanced. Further, during printing, the ink retains favorable fluidity even during the solvent volatilization process, thereby improving the wetting properties, enabling the formation of uniform dots, and enabling printed items of excellent print quality with no voids or the like to be obtained. Moreover, by using a water-soluble resin having a favorable molecular weight distribution width, namely a water-soluble resin having minimal low-molecular weight components, printed items having satisfactory coating film durability can be more easily obtained.

The weight average molecular weight and the number average molecular weight of the binder resin can be measured using typical methods. In one example, the weight average molecular weight can be measured as a polystyrene-equivalent weight average molecular weight, using a TSK-gel column (manufactured by Tosoh Corporation) and a GPC (HLC-8120GPC, manufactured by Tosoh Corporation) fitted with an RI detector, and using THF as the eluent.

The acid value is also important when selecting the water-soluble resin. In one embodiment, the acid value of the water-soluble resin is preferably from 1 to 80 mgKOH/g, and more preferably from 5 to 50 mgKOH/g. In one embodiment, the acid value of the water-soluble resin is preferably from 1 to 70 mgKOH/g, and more preferably from 3 to 65 mgKOH/g, even more preferably from 5 to 60 mgKOH/g, and particularly preferably from 7 to 55 mgKOH/g. When the acid value is at least 1 mgKOH/g, the ink can be redissolved even after solidifying, meaning blockages of the inkjet head nozzles can be suppressed, and the printing stability can be more easily improved. Further, when the acid value is not more than 70 mgKOH/g, printed items of superior water resistance can be more easily obtained, and the storage stability of the ink also improves. Moreover, the inventors of the present invention discovered that, in one embodiment, when a water-soluble resin having an acid value of 5 to 60 mgKOH/g was used, the discharge properties in the initial stages of printing were particularly favorable. Although the detailed reasons for this finding are unclear, it is thought that the aforementioned binder resin and acetylenediol-based surfactant (a1) form hydrogen bonds via the acid groups within the binder resin, enabling the viscoelasticity of the ink to be maintained at a favorable level.

The acid value can be calculated, for example, from the titer obtained when a solution of the binder resin is titrated with an ethanolic solution of potassium hydroxide (0.1 mol/L) using an automatic potentiometric titrator AT-710S manufactured by Kyoto Electronics Manufacturing Co., Ltd.

In one embodiment, the water-soluble resin may exist in a state known as a "hydrosol". Hydrosols are typically recognized as being materials positioned midway between water-soluble resins and emulsions (water-dispersible resins), but in the present description, are defined as being included within the concept of water-soluble resins. A hydrosol is a material in which the resin exists within an aqueous medium, with the acidic and/or basic functional groups that exist within the resin in a neutralized state, and although having particle-like properties, at least a portion of the surfaces of those particles are swollen and dissolved. Furthermore, compared with emulsions, hydrosols have smaller particle sizes, smaller weight average molecular weights, larger acid values, and lower turbidity.

A hydrosol can be obtained, for example, by synthesizing a resin in an organic solvent using a solution polymerization method or the like, subsequently neutralizing the resin with an amine or the like, and then adding the neutralized resin to an aqueous medium and performing a dispersion treatment. Alternatively, a hydrosol can be obtained by adding the solution of the above resin to an aqueous medium containing an amine or the like, and performing the neutralization and dispersion simultaneously.

The weight average molecular weight and the acid value for hydrosols that can be used favorably in embodiments of the invention are the same as the ranges described above for the weight average molecular weight and the acid value of the above resin.

Examples of the types of hydrosols that can be used include materials obtained by dispersing the neutralized product of a resin such as an acrylic-based resin, styrene/acrylic-based resin, urethane-based resin or polyolefin-based resin in an aqueous medium. Among these materials, in a similar manner to that described above for the water-soluble resin, hydrosols of acrylic-based resins and styrene/acrylic-based resins can be used particularly favorably. When a hydrosol is used as the binder resin, a material synthesized using conventional synthesis methods may be used, or a commercially available product may be used. In terms of the structure of the resin, resins having various structures such as random structures, block structures, comb-like structures and star-like structures may be used as desired. In the case of a hydrosol, a structure in which the portion having particle-like properties and the portion that is swollen and dissolved within the aqueous medium can be clearly distinguished is preferred. Accordingly, in one embodiment, a hydrosol obtained by neutralizing a resin having a block structure or a comb-like structure in an aqueous medium is preferred.

As described above, either resin microparticles or a water-soluble resin may be used as the binder resin, but the use of a water-soluble resin is preferred. In one embodiment, when a water-soluble resin is used as the binder resin, a water-soluble resin having a "loading index" described below that is 10 or less is preferred. Here, the water-soluble resin includes the hydrosol materials described above.

In this description, the "loading index" means a value calculated from the total amount of scattered light when a laser light is irradiated onto a sample composed of an aqueous solution of the binder resin. In an aqueous solution of the water-soluble resin, the resin either dissolves entirely in the water, or in the case of a hydrosol, the surface of the resin swells and dissolves in the water. Accordingly, it is thought that compared with an emulsion in which the resin undergoes absolutely no dissolution in the water, the scattering at the resin surface weakens. For this reason, the solubility of the resin in the water can be determined on the basis of the loading index.

Typically, if the above index is greater than 10, then a particle size distribution of high reliability can be obtained for the resin microparticles. On the other hand, a binder resin for which the index is 10 or less can be considered to be at least partially dissolved in the water. An ink using this type of binder resin is more likely to exhibit excellent discharge properties, with do instant precipitation or film formation during drying.

The "loading index" can be confirmed, for example, using a dynamic light scattering particle size distribution analyzer (UPA-EX150, manufactured by MicrotracBEL Corporation), using the method described below. First, in an atmosphere at 25° C., water is used as a dispersion medium to perform a "set zero" (background measurement). Next, an aqueous solution of the binder resin prepared so that the solid fraction concentration is 10% by weight is placed in the sample cell of the apparatus. Once the liquid surface of the aqueous solution has settled, sample loading is performed, and the displayed loading index is checked.

The amount of the binder resin, relative to the total weight of the ink, is preferably at least 0.25% by weight, and more preferably 0.5% by weight or greater. On the other hand, the amount is preferably not more than 15% by weight, and more preferably 10% by weight or less. In one embodiment, the amount is preferably at least 0.5% by weight but not more than 10% by weight, more preferably at least 1% by weight but not more than 8% by weight, and even more preferably at least 2% by weight but not more than 6% by weight. When the amount of the binder resin is at least 0.5% by weight, satisfactory compatibility can be achieved for surfactants having a small HLB value, and the storage stability of the ink can be improved. Further, when the amount of the binder resin is not more than 10% by weight, the ink viscosity can be more easily adjusted to a value within the preferred range, and an ink having excellent dischargeability can be more easily obtained.

In one embodiment, it is preferable that a water-soluble resin described above is used as the binder resin, and the amount of that water-soluble resin is adjusted to a value within the above range.

In one embodiment, a water-based inkjet ink containing a pigment, the above water-soluble resin, and a water-soluble organic solvent can be produced. In this embodiment, a resin having a molecular weight distribution width of 1.0 to 2.5 and an acid value of 1 to 70 mgKOH/g is preferably used as the water-soluble resin. Further, the water-soluble organic solvent is preferably at least one solvent selected from the group consisting of 1,2-butanediol, 1,3-butanediol, 1,2-pentanediol, 1,2-hexanediol, dipropylene glycol, 3-methoxy-1-butanol and propylene glycol monomethyl ether.

The ink of the above embodiment may contain a surfactant if required, but by using a combination of the prescribed water-soluble resin and the prescribed water-soluble organic solvent, effects including improvements in the discharge properties, including during the initial stages of printing, and improvements in the quality of the printed items and the durability of the coating film can be obtained. Accordingly, the acetylenediol-based surfactant (a1) having an HLB value determined by Griffin's method of 3 or less need not necessarily be used, and any type of surfactant may be selected and used as desired.

<Pigment>

The pigment used may be either an inorganic pigment or an organic pigment.

Examples of the inorganic pigment include titanium oxide, zinc oxide, zinc sulfide, white lead, calcium carbonate, precipitated barium sulfate, white carbon, alumina white, kaolin clay, talc, bentonite, black iron oxide, cadmium red, red iron oxide, molybdenum red, molybdate orange, chrome vermilion, chrome yellow, cadmium yellow, yellow iron oxide, titanium yellow, chromium oxide, viridian, titanium cobalt green, cobalt green, cobalt chrome green, Victoria green, ultramarine blue, Prussian blue, cobalt blue, cerulean blue, cobalt silica blue, cobalt zinc silica blue, manganese violet and cobalt violet.

Examples of the organic pigment include azo pigments, phthalocyanine pigments, anthraquinone pigments, quinacridone pigments, isoindolinone pigments, quinophthalone pigments, dye lake pigments and fluorescent pigments. Specific examples, listed in terms of their color index values, are as follows.

Examples of cyan pigments include C. I. Pigment Blue 1, 2, 3, 15:1, 15:3, 15:4, 15:6, 16, 21, 22, 60 and 64.

Examples of magenta pigments include C. I. Pigment Red 5, 7, 9, 12, 31, 48, 49, 52, 53, 57, 97, 112, 120, 122, 146, 147, 149, 150, 168, 170, 177, 178, 179, 184, 188, 202, 206, 207, 209, 238, 242, 254, 255, 264, 269 and 282, and C. I. Pigment Violet 19, 23, 29, 30, 32, 36, 37, 38, 40 and 50.

Examples of yellow pigments include C. I. Pigment Yellow 1, 2, 3, 12, 13, 14, 16, 17, 20, 24, 74, 83, 86, 93, 94, 95, 109, 110, 117, 120, 125, 128, 129, 137, 138, 139, 147, 148, 150, 151, 154, 155, 166, 168, 180, 185 and 213.

Further, examples of black pigments include carbon blacks produced by the furnace method or the channel method. Among these, carbon blacks having properties including a primary particle size of 11 to 40 nm, a specific surface area measured by the BET method of 50 to 400 $m^2/g$, a volatile fraction of 0.5 to 10% by weight, and a pH value of 2 to 10 are preferred.

Examples of commercially available products having these types of properties include No. 33, 40, 45, 52, 900, 2200B, 2300, MA7, MA8 and MCF88 (all manufactured by Mitsubishi Chemical Corporation), RAVEN 1255 (manufactured by Columbian Chemicals Co., Inc.), REGAL 330R, 400R and 660R, MOGUL L, and ELFTEX 415 (all manufactured by Cabot Corporation), and Nipex 90, Nipex 150T, Nipex 160IQ, Nipex 170IQ, Nipex 75, Printex 85, Printex 95, Printex 90, Printex 35 and Printex U (all manufactured by Evonik Degussa GmbH). Any of these listed commercially available products can be used favorably.

In one embodiment, besides the above carbon blacks, pigments such as aniline black, Lumogen black, and azomethine azo black and the like can also be used as the black pigment. Further, a plurality of color pigments such as the cyan pigments, magenta pigments and yellow pigments described above, and special color pigments such as the brown pigments and orange pigments described below, may also be used to form a black pigment.

Examples of pigments other than the cyan, magenta, yellow and black pigments described above include C. I. Pigment Green 7, 10 and 36, C. I. Pigment Brown 3, 5, 25 and 26, and C. I. Pigment Orange 2, 5, 7, 13, 14, 15, 16, 24, 34, 36, 38, 40, 43, 62, 63, 64 and 71.

In one embodiment, the amount of the pigment, relative to the total weight of the ink, is preferably at least 0.1% by weight but not more than 15% by weight, more preferably at least 0.5% by weight but not more than 10% by weight, and particularly preferably at least 1% by weight but not more than 8% by weight.

<Pigment Dispersing Resin>

In order to maintain good ink stability over a long period of time, the above pigment must be held in a dispersed state within the ink. Examples of the method used for dispersing the pigment include methods of dispersing the pigment without a dispersant by modifying the surface of the pigment using an oxidation treatment or a resin coating or the like, and methods of dispersing the pigment using a surfactant or a resin as a dispersant. In one embodiment, in order to enhance the gloss of the printed items as well as obtaining an ink having excellent storage stability and dischargeability, the pigment is preferably dispersed using a pigment dispersing resin.

There are no particular limitations on the types of pigment dispersing resins that can be used, and examples include acrylic-based resins, styrene/acrylic-based resins, maleic acid-based resins, styrene/maleic acid-based resins, urethane-based resins, ester-based resins, amide-based resins and imide-based resins. Among these, from the viewpoint of achieving more powerful adsorption of the pigment, thereby better stabilizing the pigment dispersion, one or more resins selected from the group consisting of acrylic-based resins, styrene/acrylic-based resins, urethane-based resins and ester-based resins is preferred. There are no particular limitations on the structure of these resins, and resins having random structures, block structures, comb-like structures and star-like structures may all be used as desired.

Further, the pigment dispersing resin preferably has an alkyl group of 10 to 36 carbon atoms within the resin skeleton. When a pigment dispersing resin having this type of alkyl group is used, more favorable results can be obtained in terms of the ink storage stability and the compatibility with surfactants having a small HLB value. One example of a method for synthesizing a resin having an alkyl group is a method that involves performing a condensation of an alcohol or amine having an alkyl group with a functional group such as a carboxylic acid within the resin skeleton of the base structure, whereas another method involves using a monomer having an alkyl group at the time of resin synthesis to synthesize a resin containing the alkyl group.

In terms of the molecular weight of the pigment dispersing resin, the weight average molecular weight is preferably at least 1,000 but not more than 100,000, and is more preferably at least 5,000 but not more than 50,000. By ensuring that the weight average molecular weight falls within the above range, the pigment can be stably dispersed in water. Further, favorable discharge stability can be more easily achieved. The weight average molecular weight of the pigment dispersing resin can be measured in the same manner as that described above for the binder resin.

The acid value of the pigment dispersing resin is preferably within a range from 100 to 400 mgKOH/g. Provided the acid value is at least 100 mgKOH/g, the pigment dispersing resin can be more easily dissolved in water, and the viscosity of the dispersion can be suppressed to a low level. Further, provided the acid value is not higher than 400 mgKOH/g, favorable interactions can be achieved with the surfactants, and any increases in the ink viscosity can be prevented. The acid value of the pigment dispersing resin is preferably from 120 to 350 mgKOH/g, and more preferably from 150 to 300 mgKOH/g.

In order to enhance the solubility in water, a pigment dispersing resin in which the acid groups within the resin have been neutralized with a base is preferred. Examples of bases that may be used include organic bases such as ammonia water, dimethylaminoethanol, diethanolamine and triethanolamine, and inorganic bases such as lithium hydroxide, sodium hydroxide and potassium hydroxide.

The weight ratio between the pigment and the pigment dispersing resin is preferably from 2/1 to 100/1. By adjusting the proportion of the pigment dispersing resin to a value that satisfies this range, the viscosities of the pigment dispersion and the ink cam be more easily maintained at low levels. Further, the dispersibility, viscosity and dispersion stability can be more easily improved. The ratio (weight ratio) between the pigment and the pigment dispersing resin is more preferably from 20/9 to 50/1, even more preferably from 5/2 to 25/1, and most preferably from 20/7 to 20/1.

In embodiments of the present invention, the pigment dispersing resin is distinguished from the binder resin described above on the basis of the number of functional groups capable of adsorbing to the pigment. In this description, the pigment dispersing resin is defined as a resin having a proportion of structural units containing an aromatic ring structure that is at least 25% by weight relative to the total weight of the resin, and/or having an acid value greater than 100 mgKOH/g. In contrast, the binder resin is defined as a resin that does not satisfy the above requirements, namely a resin having a proportion of structural units containing an aromatic ring structure that is less than 25% by weight relative to the total weight of the resin, and/or having an acid value of 100 mgKOH/g or less. The weight ratio within the resin of structural units containing an aromatic ring structure is calculated, for example, from the amount of monomer components containing an aromatic ring structure used in the production of the resin.

<Water>

In one embodiment, the water included in the ink is preferably not a typical water containing various ions, and the use of an ion-exchanged water (deionized water) is preferred. The amount of water in the ink is preferably within a range from 20% by weight to 90% by weight relative to the total weight of the ink.

<Other Components>

In one embodiment, in order to obtain certain desired physical property values, the water-based inkjet ink may also include additives such as antifoaming agents and preservatives in addition to the various components described above. Although there are no particular limitations on the amount of these additives, the amount is preferably within a range from at least 0.01% by weight to not more than 10% by weight relative to the total weight of the ink.

Although not a particular limitation, in one preferred embodiment, the water-based inkjet ink containing a pigment, a water-soluble organic solvent and the surfactant (A) uses a polyol-based solvent containing at least 1,2-butanediol as the water-soluble organic solvent. Further, an acetylenediol-based surfactant (a1) having an HLB value determined by Griffin's method of 3 or less, containing at least 2,5,8,11-tetramethyl-6-dodecyne-5,8-diol or 2,4,7,9-tetramethyl-5-decyne-4,7-diol is used as the above surfactant (A). The surfactant (A) preferably also contains at least one surfactant selected from the group consisting of polysiloxane-based surfactants (a2) having an HLB value determined by Griffin's method of 4 or less and polysiloxane-based surfactants (a3) having an HLB value determined by Griffin's method of at least 8 but not more than 20. When the water-based inkjet ink also contains a binder resin, the binder resin preferably contains a water-soluble resin having an acid value of 1 to 70 mgKOH/g and a molecular weight distribution width of 1.0 to 2.5.

<Printed Items>

The water-based inkjet ink of embodiments described above can be applied favorably to all manner of printing substrates, and can form coating films (printed layers) having no voids, color boundary bleeding or aggregation irregularities. Accordingly, by using the ink described above, printed items of high quality can be provided. In one embodiment, the printed item has a printing substrate, and a coating film formed on the printing substrate using the water-based inkjet ink. Although not a particular limitation, when a low-absorption substrate is used as the printing substrate and the water-based inkjet ink described above is applied to this low-absorption substrate, particularly dramatic effects can be achieved.

The term "low-absorption substrate" means a recording medium that absorbs water poorly or has a slow absorption rate. Specifically, the term "low-absorption substrate" describes a substrate which has a water absorption coefficient, measured by Bristow's method (J. TAPPI paper pulp test method No. 51-87), of 0 to 0.6 ml/m²msec$^{1/2}$. This water absorption coefficient can be measured, for example, using an Auto Scan absorption meter manufactured by Kumagai Riki Kogyo Co., Ltd. Specifically, by using the above apparatus and water, a relationship plot is generated between the amount of water absorption (ml/m²) in a contact time of 100 to 1,000 milliseconds and the square root of the contact time (msec$^{1/2}$), and the gradient of the straight line obtained by the least squares method is deemed to represent the absorption coefficient.

Specific examples of low-absorption substrates include paper substrates such as coated papers, art papers, cast papers, finely coated papers and synthetic papers; plastic substrates such as polycarbonate, rigid polyvinyl chloride, flexible polyvinyl chloride, polystyrene, foamed styrol, PMMA, polypropylene, polyethylene and PET; metal substrates such as aluminum and stainless steel; and glass. However, the range of printing substrates to which the above ink can be applied is not limited to these substrates. The water-based inkjet ink of embodiments of the present invention can also be used favorably with printing substrates other than low-absorption substrates, including plain paper, fabrics and wooden materials, and yields printed items of high quality.

<Printing Method>

In order to produce a printed item, any of various printing methods may be used to apply the water-based inkjet ink described above to the printing substrate. In terms of obtaining favorable discharge properties, the use of a method in which the ink is discharged from inkjet head nozzles, with the ink droplets being adhered to the printing substrate, is preferably used as the method for printing the inkjet ink.

EXAMPLES

The present invention is described below in further detail using a series of examples and comparative examples. In the following description, unless particularly stated otherwise, "parts", "%" and "ratios" all represent weight-referenced values.

1. Pigment Dispersion Production Examples

<Cyan Pigment Dispersion 1>

Twenty parts of LIONOGEN BLUE FG-7358G (C. I. Pigment Blue 15:3, manufactured by Toyo Color Co., Ltd.) as a pigment, 15 parts of an aqueous solution (non-volatile fraction: 20%) of a styrene/acrylic resin (a random copolymer in which styrene:acrylic acid:behenyl methacrylate=35: 30:35 (weight ratio), molecular weight: 16,000, acid value: 250) as a pigment dispersing resin and 65 parts of water were mixed, and a preliminary dispersion treatment was performed using a Disper. The aqueous solution of the styrene/acrylic resin was prepared using the method disclosed in Production Example 2 of the specification of JP 2012-188581 A.

Subsequently, the obtained mixture was subjected to a main dispersion treatment using a Dyno-Mill with a capacity of 0.6 L filled with 1,800 g of zirconia beads of diameter 0.5 mm, thus obtaining a cyan pigment dispersion 1.

<Yellow Pigment Dispersion 2>

With the exception of altering the pigment to LIONOL YELLOW TT-1405G (C. I. Pigment Yellow 14, manufactured by Toyo Color Co., Ltd.), the same method as the cyan pigment dispersion was used to obtain a yellow pigment dispersion 2.

<Magenta Pigment Dispersion 3>

With the exception of altering the pigment to FASTOGEN Super Magenta RTS (C. I. Pigment Red 122, manufactured by DIC Corporation), the same method as the cyan pigment dispersion was used to obtain a magenta pigment dispersion 3.

<Black Pigment Dispersion 4>

With the exception of altering the pigment to PrinteX 85 (carbon black, manufactured by Orion Engineered Carbons S. A.), the same method as the cyan pigment dispersion was used to obtain a black pigment dispersion 4.

2. Binder Resin Production Examples

<Binder Resin 1>

A reaction container fitted with a gas inlet tube, a thermometer, a condenser and a stirrer was charged with 93.4 parts of butanol, and the container was flushed with nitrogen gas. The contents of the reaction container were heated to 110° C., and a mixture containing 20 parts of styrene, 10 parts of methacrylic acid and 70 parts of methyl methacrylate as polymerizable monomers and 9 parts of a polymerization initiator V-601 (manufactured by Wako Pure Chemical Industries, Ltd.) was added dropwise to the container over a period of two hours to achieve a polymerization reaction. Following completion of the dropwise addition, reaction was continued at 110° C. for a further three hours, an additional 0.9 parts of V-601 (manufactured by Wako Pure Chemical Industries, Ltd.) was then added, and the reaction was continued at 110° C. for a further one hour, thus obtaining a solution of a binder resin 1. Measurement of the binder resin 1 using an HLC-8120GPC manufactured by Tosoh Corporation revealed a weight average molecular weight of about 12,000 and a molecular weight distribution width of 2.3.

Following cooling of the solution of the binder resin 1 to room temperature, 37.1 parts of dimethylaminoethanol was added to neutralize the solution, and 100 parts of water was added to generate an aqueous solution. Subsequently, the obtained solution was heated to at least 100° C., and the butanol was removed by azeotropic distillation with the water to adjust the solid fraction to 50%, thus obtaining an aqueous solution of the binder resin 1 (solid fraction: 50%). The acid value of the binder resin 1, which was measured and calculated using an automatic potentiometric titrator AT-710S manufactured by Kyoto Electronics Manufacturing Co., Ltd., was 65.

Furthermore, 40 parts of water was added to 10 parts of the aqueous solution of the binder resin 1 to form an aqueous solution having a solid fraction concentration of 10%. Measurement of the loading index of this solution using a UPA-EX150 manufactured by MicrotracBEL Corporation revealed a value of 10 or less. Based on this result, it was evident that the above binder resin 1 was able to be used favorably as a water-soluble resin in the present invention.

<Binder Resins 2 to 23>

With the exceptions of altering the polymerizable monomers used and the amount of the dimethylaminoethanol added for the purpose of neutralization to the respective formulations shown in Table 1, aqueous solutions (solid fraction: 50%) of binder resins 2 to 23 were obtained in exactly the same manner as the production of the binder resin 1. The values shown in Table 1 for the weight average molecular weight, the molecular weight distribution width and the acid value represent values measured using the same methods as those described for the binder resin 1.

Forty parts of water was added to 10 parts of each of the aqueous solutions of the binder resins 2 to 23 to prepare aqueous solutions having a solid fraction concentration of 10%. Measurement of the loading index of each of these aqueous solutions in the same manner as the binder resin 1 revealed a value of 10 or less in each case. Based on these results, it was evident that each of the above binder resins 2 to 23 was able to be used favorably as a water-soluble resin in the present invention.

Subsequently, a mixture of 10 parts of styrene, 70 parts of methyl methacrylate and 10 parts of stearyl methacrylate as polymerizable monomers B, and 0.06 parts of V-65 (manufactured by Wako Pure Chemical Industries, Ltd.) as a polymerization initiator was added to the reaction container, and the polymerization reaction was continued at 75° C. for a further 3 hours, thus obtaining a solution of a binder resin 24. The weight average molecular weight of the binder resin 24 was about 18,000, and the molecular weight distribution

TABLE 1

| Binder resin | Polymerizable monomers having an alkyl group | | | | | | | | | Other polymerizable monomers | | | DMAE (parts by weight) | Properties | | |
|---|---|---|---|---|---|---|---|---|---|---|---|---|---|---|---|---|
| | C1 | C6 | C8 | C10 | C12 | | C18 | C22 | | Ar | | COOH | | Mw | Mw/Mn | Acid value |
| | MMA | HeMA | 2EHMA | DeMA | LMA | LA | StMA | VMA | VA | St | BzMA | AA | MAA | | | | |
| 1 | 70 | | | | | | | | | 20 | | | 10 | 37.1 | 12000 | 2.3 | 65 |
| 2 | 50 | 20 | | | | | | | | 20 | | | 10 | 37.1 | 13000 | 2.2 | 65 |
| 3 | 50 | | 20 | | | | | | | 20 | | | 10 | 37.1 | 13500 | 2.2 | 65 |
| 4 | 50 | | | 20 | | | | | | 20 | | | 10 | 37.1 | 14500 | 2.2 | 65 |
| 5 | 50 | | | | 20 | | | | | 20 | | | 10 | 37.1 | 15000 | 2.2 | 65 |
| 6 | 50 | | | | | 20 | | | | 20 | | | 10 | 37.1 | 15000 | 2.2 | 65 |
| 7 | 50 | | | | | | 20 | | | 20 | | | 10 | 37.1 | 17000 | 2.2 | 65 |
| 8 | 50 | | | | | | | 20 | | 20 | | | 10 | 37.1 | 18000 | 2.2 | 65 |
| 9 | 50 | | | | | | | | 20 | 20 | | | 10 | 37.1 | 18000 | 2.2 | 65 |
| 10 | 68 | | | | 10 | | | | | 10 | | | 12 | 44.5 | 14000 | 2.2 | 78 |
| 11 | 71 | | | | 10 | | | | | 10 | | | 9 | 33.6 | 14000 | 2.2 | 59 |
| 12 | 74 | | | | 10 | | | | | 10 | | | 6 | 22.2 | 14500 | 2.2 | 39 |
| 13 | 77 | | | | 10 | | | | | 10 | | | 3 | 11.4 | 14500 | 2.2 | 20 |
| 14 | 79 | | | | 10 | | | | | 10 | | | 1 | 3.9 | 14500 | 2.2 | 7 |
| 15 | 79.5 | | | | 10 | | | | | 10 | | | 0.5 | 2.3 | 15000 | 2.3 | 4 |
| 16 | 80 | | | 15 | | | | | | | 5 | | | 22.2 | 26000 | 2.2 | 39 |
| 17 | 80 | | | 15 | | | | | | | 5 | | | 22.2 | 19500 | 1.8 | 39 |
| 18 | 80 | | | 15 | | | | | | | 5 | | | 22.2 | 16500 | 1.4 | 39 |
| 19 | 80 | | | 15 | | | | | | | 5 | | | 22.2 | 6000 | 1.5 | 39 |
| 20 | 65 | | | 15 | | | | | | 15 | 5 | | | 22.2 | 17000 | 1.5 | 39 |
| 21 | 65 | | | 15 | | | | | | 15 | | | 5 | 18.8 | 18000 | 1.5 | 33 |
| 22 | 77 | | | | | | 10 | | | 10 | | | 3 | 11.4 | 6000 | 1.5 | 20 |
| 23 | 77 | | | | | | | 10 | | | 10 | | 3 | 11.4 | 26000 | 1.4 | 20 |

The abbreviations used in Table 1 have the following meanings.
MMA: methyl methacrylate (C1 alkyl group-containing monomer)
HeMA: hexyl methacrylate (C6 alkyl group-containing monomer)
2EHMA: 2-ethylhexyl methacrylate (C8 alkyl group-containing monomer)
DeMA: decyl methacrylate (C10 alkyl group-containing monomer)
LMA: lauryl methacrylate (C12 alkyl group-containing monomer)
LA: lauryl acrylate (C12 alkyl group-containing monomer)
StMA: stearyl methacrylate (C18 alkyl group-containing monomer)
VMA: behenyl methacrylate (C22 alkyl group-containing monomer)
VA: behenyl acrylate (C22 alkyl group-containing monomer)
St: styrene (aromatic ring (Ar)-containing monomer)
BzMA: benzyl methacrylate (aromatic ring (Ar)-containing monomer)
AA: acrylic acid (carboxyl (—COOH) group-containing monomer)
MAA: methacrylic acid (carboxyl (—COOH) group-containing monomer)
DMAE: dimethylaminoethanol
Mw: Weight average molecular weight
Mw/Mn: molecular weight distribution width <Binder Resin 24>

A reaction container fitted with a gas inlet tube, a thermometer, a condenser and a stirrer was charged with a mixture of 3 parts of methacrylic acid and 7 parts of methyl methacrylate as polymerizable monomers A, 2.4 parts of V-65 (manufactured by Wako Pure Chemical Industries, Ltd.) as a polymerization initiator, 1.8 parts of 2-iodo-2-cyanopropane, 0.18 parts of 2-tert-butyl-4,6-dimethylphenol, and 103.5 parts of diethylene glycol dimethyl ether. Subsequently, the reaction container was flushed with nitrogen gas, the contents of the reaction container were then heated to 75° C., and the polymerization reaction was allowed to proceed across a period of 3 hours.

width was 1.3. These values were measured and calculated in the same manner as the binder resin 1.

Following cooling of the solution of the binder resin 24 to room temperature, 11.5 parts of dimethylaminoethanol was added to neutralize the solution, and 100 parts of water was added to generate an aqueous solution. The obtained solution was heated to at least 100° C. under reduced pressure, thereby removing the diethylene glycol dimethyl ether by distillation, and by subsequently adjusting the solid fraction to 30%, an aqueous solution of the binder resin 24 (solid fraction: 30%) was obtained.

The thus obtained binder resin 24 was a block copolymer having an A block composed of a polymer of the polymerizable monomers A and a B block composed of a polymer of the polymerizable monomers B. The acid value of the binder resin 24, measured and calculated in the same manner as the binder resin 1, was 20.

Furthermore, 33.3 parts of water was added to 16.7 parts of the aqueous solution of the binder resin 24 to form an aqueous solution having a solid fraction concentration of 10%. Measurement of the loading index of this solution revealed a value of 10 or less. Based on this result, it was evident that the above binder resin 24 was able to be used favorably as a water-soluble resin in the present invention.

<Binder Resin 25>

With the exceptions of using 10 parts of lauryl methacrylate as the polymerizable monomer A, using 4.5 parts of acrylic acid and 85.5 parts of methyl methacrylate as the polymerizable monomers B, and altering the amount of dimethylaminoethanol added to achieve neutralization to 20.0 parts, exactly the same method as that described for the binder resin 24 was used to obtain an aqueous solution (solid fraction: 30%) of a binder resin 25.

The thus obtained binder resin 25 was a block copolymer having an A block composed of a polymer of the polymerizable monomer A and a B block composed of a polymer of the polymerizable monomers B. The weight average molecular weight of the binder resin 25 was about 11,000, the molecular weight distribution width was 1.5, and the acid value was 35. These values were measured and calculated in the same manner as described for the binder resin 1.

Furthermore, measurement of the loading index of a 10% aqueous solution of the binder resin 25 using the same method as the binder resin 24 revealed a value of 10 or less. Based on this result, it was evident that the above binder resin 25 was able to be used favorably as a water-soluble resin in the present invention.

<Binder Resin 26>

A reaction container fitted with a thermometer, a dropping funnel, a condenser and a stirrer was charged with 40 parts of ion-exchanged water and 0.2 parts of AQUALON KH-10 (manufactured by DKS Co., Ltd.) as an emulsifier. In a separate container, 15 parts of 2-ethylhexyl acrylate, 69 parts of methyl methacrylate, 1 part of acrylic acid, 15 parts of styrene, 53 parts of ion-exchanged water and 1.8 parts of AQUALON KH-10 (manufactured by DKS Co., Ltd.) as an emulsifier were stirred and mixed with a Homo mixer to prepare an emulsion.

Subsequently, 5 parts of the above emulsion was extracted and added to the above reaction container. Following the addition, the internal temperature of the reaction container was raised to 60° C., and following thorough flushing with nitrogen, 3 parts of a 5% aqueous solution of potassium persulfate and 4 parts of a 1% aqueous solution of anhydrous sodium bisulfite were added, and a polymerization reaction was initiated.

Following initiation of the reaction, the internal temperature was held at 60° C. while the remainder of the above emulsion, 2 parts of the 5% aqueous solution of potassium persulfate and 6 parts of the 1% aqueous solution of anhydrous sodium bisulfite were added dropwise to the container over a period of 1.5 hours, and stirring was then continued for a further 2 hours. Following completion of the reaction, the temperature was cooled to 30° C., and diethylaminoethanol was added to adjust the pH to 8.5. Ion-exchanged water was then added to adjust the solid fraction to 40%, thus obtaining a solution (solid fraction: 40%) of a binder resin 26.

The binder resin 26 had a weight average molecular weight of about 350,000, and a molecular weight distribution width of 1.7. Further, the acid value of the binder resin 26 was 7. These values were measured and calculated in the same manner as described for the binder resin 1.

Furthermore, 37.5 parts of water was added to 12.5 parts of the solution of the binder resin 26 to form a solution having a solid fraction concentration of 10%. Measurement of the loading index of this solution in the same manner as the binder resin 1 revealed a value of about 40. Based on this result, it was evident that the above binder resin 26 was unsuitable for use as a water-soluble resin in the present invention.

<Binder Resin 27>

A reaction container fitted with a gas inlet tube, a thermometer, a condenser and a stirrer was charged with 42 parts of a polypropylene glycol #2000 as a polymerizable monomer and 0.01 parts of dibutyltin dilaurate as a catalyst, and the container was flushed with nitrogen gas. The contents of the reaction container were then heated to 100° C., a polymerization reaction was allowed to proceed over a period of 4 hours, and the temperature inside the reaction container was then cooled to 60° C. or lower.

Subsequently, as a polymerizable monomer, 3 parts of neopentyl glycol, 3 parts of dimethylolpropionic acid, 45 parts of isophorone diisocyanate and 150 parts of methyl ethyl ketone were added to the reaction container. The contents of the reaction container were then heated to 80° C., and by letting the polymerization reaction proceed over a period of 6 hours, a solution of a binder resin 27 was obtained. The weight average molecular weight of the binder resin 27, measured in the same manner as the binder resin 1, was about 36,000, and the molecular weight distribution width was 2.3.

After cooling the solution of the binder resin 27 to room temperature, 22 parts of dimethylaminoethanol was added to neutralize the solution, and 100 parts of water was added to generate an aqueous solution. The obtained solution was heated to at least 80° C. under reduced pressure, and following removal of the methyl ethyl ketone by distillation, the solid fraction was adjusted to 10%, thus obtaining an aqueous solution (solid fraction: 10% by weight) of a urethane resin as the binder resin 27. The acid value of the binder resin 27, measured and calculated in the same manner as the binder resin 1, was 39.

Using this aqueous solution of the binder resin 27, measurement of the loading index of the aqueous solution using the same method as the binder resin 1 revealed a value of 10 or less. Based on this result, it was evident that the above binder resin 27 was able to be used favorably as a water-soluble resin in the present invention.

3. Surfactant Synthesis Examples

<Acetylenediol-Based Surfactant (a1)>

Using the method disclosed in Example 1 of the specification of JP 2002-356451 A, and using methyl isoamyl ketone as the raw material ketone, 2,5,8,11-tetramethyl-6-dodecyne-5,8-diol was synthesized. The HLB value of this compound was 2.7.

Further, in a similar manner, various compounds were synthesized by changing the compound used as the raw material ketone. Specifically, by using di-n-propyl ketone (4-heptanone), 4,7-dipropyldec-5-yne-4,7-diol (HLB value=2.7) was obtained, by using methyl hexyl ketone (2-octanone), 7,10-dimethylhexadec-8-yne-7,10-diol (HLB value=2.4) was obtained, and by using methyl isobutyl ketone, 2,4,7,9-tetramethyl-5-decyne-4,7-diol (HLB value=3.0) was obtained.

<Polysiloxane-Based Surfactant 1>

A reaction container fitted with a gas inlet tube, a thermometer, a condenser and a stirrer was charged with 360 g of ethylene glycol allyl methyl ether and 0.5 g of a 0.5% by weight toluene solution of platinic chloride, and the container was flushed with nitrogen gas. The reaction container contents were heated to 70° C., and 480 g of hexadecamethyloctasiloxane in which both terminals of the siloxane chain were blocked with hydrogen atoms was then added dropwise to the container over 30 minutes.

Subsequently, the inside of the reaction container was heated to 110° C., and this temperature was maintained for 3 hours while stirring was continued, thereby reacting the above materials. Following completion of the reaction, low-boiling point components were removed by distillation under reduced pressure, yielding a polyether-modified siloxane 1. The thus obtained polyether-modified siloxane 1 was a compound having a structure represented by general formula (4), in which r=6 and $R_1$ was a group represented by general formula (3) in which m=3, n=1, o=0 and $R_3$ represents $CH_3$. The HLB value of this compound was 3.8.

<Polysiloxane-Based Surfactant 2>

With the exceptions of altering the amount added of the ethylene glycol allyl methyl ether to 180 g, and using 200 g of heptamethyltrisiloxane in which one hydrogen atom is bonded to the central silicon atom instead of the hexadecamethyloctasiloxane, a polysiloxane-based surfactant 2 was obtained using the same method as the polysiloxane-based surfactant 1. The thus obtained polyether-modified siloxane 2 was a compound having a structure represented by general formula (2), in which p=0, q=1, $R_2$ represents $CH_3$, and $R_1$ was a group represented by general formula (3) in which m=3, n=1, o=0 and $R_3$ represents $CH_3$. The HLB value of this compound was 4.6.

<Polysiloxane-Based Surfactant 3>

With the exceptions of using 500 g of diethylene glycol allyl methyl ether instead of the ethylene glycol allyl methyl ether, and using 180 g of hexamethyltrisiloxane in which both terminals of the siloxane chain were blocked with hydrogen atoms instead of the hexadecamethyloctasiloxane, a polysiloxane-based surfactant 3 was obtained using the same method as the polysiloxane-based surfactant 1. The thus obtained polyether-modified siloxane 3 was a compound having a structure represented by general formula (4), in which r=1 and $R_1$ was a group represented by general formula (3) in which m=3, n=2, o=0 and $R_3$ represents $CH_3$. The HLB value of this compound was 19.5.

Examples 1 to 82, Comparative Examples 1 to 4

(1) Ink Composition Production Examples

Production Example for Inks 1C, 1M, 1Y, 1K

Twenty parts of the cyan pigment dispersion 1, 25 parts of 1,2-butanediol and 1 part of 2,5,8,11-tetramethyl-6-dodecyne-5,8-diol were added sequentially to a mixing container, sufficient water was then added to make the total ink amount up to 100 parts, and the resulting mixture was stirred until uniform with a Disper. Subsequently, the obtained mixture was filtered through a membrane filter having a pore size of 1 μm to remove coarse particles that can cause head blockages, thus obtaining an ink 1C.

With the exception of using the yellow pigment dispersion 2, the magenta pigment dispersion 3 and the black pigment dispersion 4 respectively instead of the above cyan pigment dispersion 1, inks 1Y, 1M and 1K were obtained in exactly the same manner as the ink 1C.

Production Examples for Inks 2 to 86

Using the formulations shown in Tables 2 to 7, the same method as the production example for the ink 1C was used to produce inks 2 to 86 (each including the four colors of C, Y, M and K>.

(2) Evaluations of Inks

Using the prepared inks 1 to 86, each of the various evaluations described below was performed. The evaluations results were as shown in Tables 2 to 7.

<Evaluation 1: Evaluation of Solid Portion Voids>

Using an inkjet discharge apparatus fitted with a head (QA06NTB) manufactured by Kyocera Corporation, each of the above cyan inks 1C to 86C was discharged under printing conditions including a frequency of 20 kHz and a resolution of 600×600 dpi, and solid printing was performed at a print ratio of 100%. A UPM Finesse Gloss paper (coated paper) was used as the printing substrate. Following printing, the printed item was dried for 3 minutes using a 50° C. air oven, and a void evaluation was performed by inspecting the level of voids in the printed item under a magnifying glass and with the naked eye.

The evaluation criteria were as follows. An evaluation of 2 or higher represents a practically usable level.

4: no voids were visible under the magnifying glass or with the naked eye.

3: slight voids were visible under the magnifying glass, but no voids were visible with the naked eye.

2: slight voids were visible with the naked eye.

1: voids were clearly visible with the naked eye.

<Evaluation 2: Evaluation of Boundary Bleeding Between Colors>

An inkjet discharge apparatus was fitted with four heads (QA06NTB) manufactured by Kyocera Corporation arranged along the transport direction of the printing substrate, and the heads were filled with cyan, magenta, yellow and black inks in that order from the upstream side. A similar printing substrate to the evaluation 1 was prepared, and was passed under the above heads at a constant speed. Ink was discharged from each of the heads under printing conditions including a frequency of 20 kHz and a resolution of 600×600 dpi, and 1 cm×1 cm 100% solid patches of each color were printed so that the patches were adjacent to one another. Following printing, the printed item was dried for 3 minutes using a 50° C. air oven, and a boundary bleeding evaluation was performed by inspecting the level of boundary bleeding between the solid colors under a magnifying glass and with the naked eye.

The evaluation criteria were as follows. An evaluation of 2 or higher represents a practically usable level.

4: no boundary bleeding between colors was visible under the magnifying glass or with the naked eye.

3: slight boundary bleeding between colors was visible under the magnifying glass, but no boundary bleeding was visible with the naked eye.

2: slight boundary bleeding between colors was visible with the naked eye.

1: boundary bleeding between colors was clearly visible with the naked eye.

<Evaluation 3: Evaluation of Aggregation Irregularities>

Using the same printing substrate and printing conditions as the evaluation 1, each of the colors, namely cyan, magenta, yellow and black, was used to print a gradation pattern in which the print ratio varied from 10% to 100% in 10% steps. Following printing, the printed item was dried for 3 minutes using a 50° C. air oven, and an evaluation of the aggregation irregularities was performed by inspecting the level of aggregation irregularities in the printed portions having print ratios of 20%, 50% and 80% under a magnifying glass and with the naked eye.

The evaluation criteria were as follows. An evaluation of 2 or higher represents a practically usable level. The results shown in Tables 2 to 7 relate to the result for the color that exhibited the worst result among the 4 colors that were evaluated.

4: no aggregation irregularities were visible under a magnifying glass or with the naked eye in any of the locations at print ratios of 20%, 50% and 80%.

3: aggregation irregularities were visible under a magnifying glass in one or more of the locations at print ratios of 20%, 50% and 80%, but no aggregation irregularities were visible with the naked eye.

2: slight aggregation irregularities were visible with the naked eye in one or more of the locations at print ratios of 20%, 50% and 80%.

1: aggregation irregularities were clearly visible with the naked eye in one or more of the locations at print ratios of 20%, 50% and 80%.

<Evaluation 4: Evaluation of Dischargeability>

Using the same printing substrate and printing conditions as the evaluation 1, solid printing at a print ratio of 100% was performed using each of the colors, namely cyan, magenta, yellow and black. Following printing, the inkjet printing apparatus was placed in standby mode for a fixed period in an environment at 25° C., and solid printing at a print ratio of 100% was then repeated using the same printing substrate and under the same printing conditions. The dischargeability was evaluated by checking, under a magnifying glass and with the naked eye, whether the initially discharged portion of the solid image had printed satisfactorily.

The evaluation criteria were as follows. An evaluation of 2 or higher represents a practically usable level. The results shown in Tables 2 to 7 relate to the result for the color that exhibited the worst result among the 4 colors that were evaluated.

4: even when printing was preformed after 3 hours of standby, no defects were visible in the initially discharged portion.

3: when printing was performed after 3 hours of standby, defects were visible in the initially discharged portion, but after 2 and a half hours of standby, no defects were visible.

2+: when printing was performed after 2 and a half hours of standby, defects were visible in the initially discharged portion, but after 2 hours of standby, no defects were visible.

2: when printing was performed after 2 hours of standby, defects were visible in the initially discharged portion, but after 1 hour of standby, no defects were visible.

1: even when printing was performed after 1 hour of standby, defects were visible in the initially discharged portion.

<Evaluation 5: Evaluation of Drying Properties>

Using the same discharge apparatus, printing substrate and printing conditions as the evaluation 2, solid printing was performed at a print ratio of 300% by overlaying solid printed portions of each of cyan, magenta and yellow each having print ratio of 100%. After heating for a prescribed time using a 50° C. air oven, the drying properties of the printed item were evaluated by touching the printed item with a finger.

The evaluation criteria were as follows. An evaluation of 2 or higher represents a practically usable level.

4: even when the printed item was touched with a finger after 1 minute in the oven, no ink adhered to the finger.

3: ink adhered to the finger after 1 minute in the oven, but no ink adhered after 2 minutes in the oven.

2: ink adhered to the finger after 2 minutes in the oven, but no ink adhered after 3 minutes in the oven.

1: ink adhered to the finger even after 3 minutes in the oven.

<Evaluation 6: Evaluation of Ink Storage Stability>

For each color of the inks 1 to 86, the ink viscosity was measured using an E-type viscometer (TVE-20L, manufactured by Toki Sangyo Co., Ltd.), under conditions including a temperature of 25° C. and a rotational rate of 50 rpm. The ink was then placed in a sealed container and stored in a thermostatic chamber at 70° C., and after a certain period of time had passed, the same apparatus was used to remeasure the viscosity, and the storage stability of the ink was evaluated by calculating the change in the ink viscosity over the storage period.

The evaluation criteria were as follows. An evaluation of 2 or higher represents a practically usable level. The results shown in Tables 2 to 7 relate to the result for the color that exhibited the worst result among the 4 colors that were evaluated.

4: the change in viscosity after storage for 4 weeks was less than ±5%.

3: the change in viscosity after storage for 2 weeks was less than ±5%.

2+: the change in viscosity after storage for 10 days was less than ±5%.

2: the change in viscosity after storage for 1 week was less than ±5%.

1: the change in viscosity after storage for 1 week was at least ±5%.

<Evaluation 7: Evaluation of Initial Discharge Stability>

For the inks 46 to 86, the method described below was used to evaluate the initial discharge stability. The cyan, magenta, yellow and black inks were each used to fill the same apparatus as that used in the evaluation 1, a nozzle check pattern was printed, and a check was performed to confirm that ink discharge had occurred normally from all of the nozzles. After standing for one minute, solid printing was performed at a print ratio of 100% under conditions including a frequency of 30 kHz and a resolution of 600×600 dpi. The initial discharge stability at that time was evaluated by checking, with the naked eye and under a magnifying glass, whether the initially discharged portion of the 100% solid image had printed satisfactorily.

The evaluation criteria were as follows. An evaluation of 2 or higher represents a practically usable level. The results shown in Tables 5 to 7 relate to the result for the color that exhibited the worst result among the 4 colors that were evaluated. Further, the printing substrate was the same as the evaluation 1.

4: when checked with the naked eye or under a magnifying glass, absolutely no defects were visible in the initially discharged portion.

3: no defects were visible with the naked eye, but slight defects were visible in the initially discharged portion when checked under a magnifying glass.

2+: slight defects were visible with the naked eye, and defects were clearly visible in the initially discharged portion when checked under a magnifying glass.

2: when checked with the naked eye, defects were visible in the initially discharged portion, but at a level that was not problematic for practical application.

1: when checked with the naked eye, defects were visible in the initially discharged portion at a level that was problematic for practical application.

<Evaluation 8: Evaluation of Alcohol Resistance (Coating Film Durability)>

For the inks 46 to 86, the method described below was used to evaluate the alcohol resistance (coating film durability). Using the same printing substrate and printing conditions as the evaluation 1, solid printing at a print ratio of 100% was performed using each of the colors, namely cyan, magenta, yellow and black. Following printing, the printed item was dried for one minute using a 70° C. air oven, and the printed item was then rubbed with a cotton swab that had been dipped in a 50% aqueous solution of ethanol, and the coating film durability (alcohol resistance) was evaluated by determining the number of rubbing repetitions necessary to remove the ink sufficiently to expose the substrate.

The evaluation criteria were as follows. An evaluation of 2 or higher represents a practically usable level. The results shown in Tables 5 to 7 relate to the result for the color that exhibited the worst result among the 4 colors that were evaluated.

4: the number of rubbing repetitions performed until the substrate became visible was 20 or greater.

3: the number of rubbing repetitions performed until the substrate became visible was from 15 to 19.

2+: the number of rubbing repetitions performed until the substrate became visible was from 11 to 14.

2: the number of rubbing repetitions performed until the substrate became visible was from 6 to 10.

1: the number of rubbing repetitions performed until the substrate became visible was 5 or fewer.

The abbreviations used in Tables 2 to 7 have the following meanings.

<1> Water-Soluble Organic Solvents
(1,2-alkanediols having an HLB value of 8 or less)
 12BD: 1,2-butanediol
 12HD: 1,2-hexanediol
 12PD: 1,2-pentanediol
(Water-soluble organic solvents having an HLB value of 8 or less)
 DPG: dipropylene glycol
 3MB: 3-methoxy-1-butanol
 PGME: propylene glycol monomethyl ether
 13BD: 1,3-butanediol
(Water-soluble organic solvents having an HLB value greater than 8)
 PG: propylene glycol <2> Acetylenediol-Based Surfactants
(Acetylenediol-based surfactants (a1) having an HLB value of 3 or less)
 TMDDD: 2,5,8,11-tetramethyl-6-dodecyne-5,8-diol
 TMDD: 2,4,7,9-tetramethyl-5-decyne-4,7-diol
(Acetylenediol-based surfactants having an HLB value greater than 3)
 Surfynol 440: manufactured by Air Products and Chemicals, Inc., HLB value=8.0
 Surfynol 465: manufactured by Air Products and Chemicals, Inc., HLB value=13.0

<3> Polysiloxane-Based Surfactants
(Polysiloxane-based surfactants (a2) having an HLB value of 4 or less)
 TEGO Wet 280: manufactured by Evonik Degussa GmbH, HLB value=3.5 (measured value)
 Surfactant 1: the polysiloxane-based surfactant 1 described in the surfactant synthesis examples (HLB value=3.8)
(Polysiloxane-based surfactants (a3) having an HLB value of at least 8 but not more than 20)
 BYK-333: manufactured by BYK Chemie GmbH, HLB value=10.1
 TEGO Glide 440: manufactured by Evonik Degussa GmbH, HLB value=13.5 (measured value)
 FZ-77: manufactured by Dow Corning Toray Co., Ltd., HLB value=11.0
 KF-640: manufactured by Shin-Etsu Chemical Co., Ltd., HLB value=13.5
 Surfactant 3: the polysiloxane-based surfactant 3 described in the surfactant synthesis examples (HLB value=19.5)
(Other Polysiloxane-Based Surfactants)
 Surfactant 2: the polysiloxane-based surfactant 2 described in the surfactant synthesis examples (HLB value=4.6)

<4> Binder Resins
 Binder resins 1 to 27: the binder resins 1 to 27 described in the binder resin production examples

TABLE 2

| | | | | | Examples | | | | | | | |
|---|---|---|---|---|---|---|---|---|---|---|---|---|
| | | | | | 1 | 2 | 3 | 4 | 5 | 6 | 7 | 8 |
| Ink | | | | | 1 | 2 | 3 | 4 | 5 | 6 | 7 | 8 |
| Pigment dispersion (pigment concentration: 20%) | | | | | 25% | 25% | 25% | 25% | 25% | 25% | 25% | 25% |
| <1> | 1,2-alkane diol | 12BD | | HLB: 7.6 | 25% | 25% | 25% | 25% | 25% | 25% | 25% | 25% |
| <2> | Surfactant (a1) | TMDDD | | HLB: 2.7 | 1% | | | | | 0.25% | 0.6% | 3% | 6% |
| | | 4,7-dipropyl-dec-5-yne-4,7-diol | | HLB: 2.7 | | 1% | | | | | | | |
| | | TMDD | | HLB: 3.0 | | | 1% | | | | | | |
| | | 7,10-dimethylhexadec-8-yne-7,10-diol | | HLB: 2.4 | | | | 1% | | | | | |
| <3> | Surfactant (a2) | Surfactant 1 | | HLB: 3.8 | | | | | | | | | |
| | | TEGO Wet 280 | | HLB: 3.5 | | | | | | | | | |
| | Other surfactant | Surfactant 2 | | HLB: 4.6 | | | | | | | | | |

TABLE 2-continued

| | | | | | | | | |
|---|---|---|---|---|---|---|---|---|
| Water | balance | balance | balance | balance | balance | balance | balance | balance |
| Evaluation 1: Solid portion voids | 3 | 3 | 2 | 4 | 2 | 3 | 3 | 4 |
| Evaluation 2: Boundary bleeding between colors | 2 | 2 | 2 | 2 | 2 | 2 | 2 | 2 |
| Evaluation 3: Aggregation irregularities | 2 | 2 | 2 | 2 | 2 | 2 | 2 | 3 |
| Evaluation 4: Dischargeability | 4 | 4 | 4 | 3 | 4 | 4 | 3 | 2 |
| Evaluation 5: Drying properties | 4 | 4 | 4 | 4 | 4 | 4 | 4 | 4 |
| Evaluation 6: Storage stability | 3 | 3 | 3 | 2 | 3 | 3 | 2 | 2 |

| | | | | | Example | | | | |
|---|---|---|---|---|---|---|---|---|---|
| | | | | 9 | 10 | 11 | 12 | 13 | 14 | 15 |
| Ink | | | | 9 | 10 | 11 | 12 | 13 | 14 | 15 |
| Pigment dispersion (pigment concentration: 20%) | | | | 25% | 25% | 25% | 25% | 25% | 25% | 25% |
| <1> | 1,2-alkane diol | 12BD | HLB: 7.6 | 25% | 25% | 25% | 25% | 25% | 25% | 25% |
| <2> | Surfactant (a1) | TMDDD | HLB: 2.7 | | | | | | | |
| | | 4,7-dipropyl-dec-5-yne-4,7-diol | HLB: 2.7 | 1% | 1% | 1% | 1% | 1% | 1% | 1% |
| | | TMDD | HLB: 3.0 | | | | | | | |
| | | 7,10-dimethylhexadec-8-yne-7,10-diol | HLB: 2.4 | | | | | | | |
| <3> | Surfactant (a2) | Surfactant 1 | HLB: 3.8 | | 1% | | | | | |
| | | TEGO Wet 280 | HLB: 3.5 | 1% | | | 0.1% | 0.25% | 3% | 3.5% |
| | Other | Surfactant 2 | HLB: 4.6 | | | 1% | | | | |
| Water | | | | balance | balance | balance | balance | balance | balance | balance |
| Evaluation 1: Solid portion voids | | | | 4 | 4 | 3 | 3 | 4 | 4 | 4 |
| Evaluation 2: Boundary bleeding between colors | | | | 3 | 4 | 3 | 3 | 3 | 3 | 3 |
| Evaluation 3: Aggregation irregularities | | | | 3 | 3 | 3 | 3 | 3 | 3 | 3 |
| Evaluation 4: Dischargeability | | | | 4 | 4 | 4 | 4 | 4 | 4 | 4 |
| Evaluation 5: Drying properties | | | | 4 | 4 | 4 | 4 | 4 | 4 | 4 |
| Evaluation 6: Storage stability | | | | 3 | 2 | 3 | 3 | 3 | 3 | 2 |

<1> Water-soluble organic solvents,
<2> Acetylene-based surfactants,
<3> Polysiloxane-based surfactants

TABLE 3

| | | | | Examples | | | | | | |
|---|---|---|---|---|---|---|---|---|---|---|
| | | | | 16 | 17 | 18 | 19 | 20 | 21 | 22 | 23 |
| Ink | | | | 16 | 17 | 18 | 19 | 20 | 21 | 22 | 23 |
| Pigment dispersion (pigment concentration: 20%) | | | | 25% | 25% | 25% | 25% | 25% | 25% | 25% | 25% |
| <1> | 1,2-alkane diol | 12HD | HLB: 5.8 | | | | | | | | |
| | | 12PD | HLB: 6.5 | | | | | | | | |
| | | 12BD | HLB: 7.6 | 25% | 25% | 25% | 25% | 25% | 25% | 25% | 25% |
| | Solvent (HLB of 8 or less) | DPG | HLB: 4.5 | | | | | | | | |
| | | 3MB | HLB: 2.4 | | | | | | | | |
| <2> | Surfactant (a1) | TMDDD | HLB: 2.7 | 1% | 1% | 1% | 1% | 1% | 1% | 1% | 1% |
| <3> | Surfactant (a2) | TEGO Wet 280 | HLB: 3.5 | | | | | | | | |
| | Surfactant (a3) | BYK-333 | HLB: 10.1 | 0.1% | | | | | | | |
| | | TEGO Glide 440 | HLB: 13.5 | | 0.1% | | | | 0.05% | 0.25% | 0.5% |
| | | FZ-77 | HLB: 11.0 | | | 0.1% | | | | | |
| | | KF-640 | HLB: 13.5 | | | | 0.1% | | | | |
| | | Surfactant 3 | HLB: 19.5 | | | | | 0.1% | | | |
| Water | | | | balance | balance | balance | balance | balance | balance | balance | balance |
| Evaluation 1: Solid portion voids | | | | 3 | 3 | 3 | 3 | 3 | 2 | 3 | 3 |
| Evaluation 2: Boundary bleeding between colors | | | | 3 | 4 | 3 | 4 | 4 | 3 | 4 | 4 |
| Evaluation 3: Aggregation irregularities | | | | 4 | 4 | 4 | 4 | 4 | 4 | 4 | 4 |
| Evaluation 4: Dischargeability | | | | 4 | 4 | 4 | 4 | 4 | 4 | 4 | 4 |
| Evaluation 5: Drying properties | | | | 4 | 4 | 4 | 4 | 4 | 4 | 4 | 4 |
| Evaluation 6: Storage stability | | | | 3 | 3 | 3 | 3 | 3 | 3 | 3 | 3 |

| | | | | Examples | | | | | | |
|---|---|---|---|---|---|---|---|---|---|
| | | | | 24 | 25 | 26 | 27 | 28 | 29 | 30 |
| Ink | | | | 24 | 25 | 26 | 27 | 28 | 29 | 30 |
| Pigment dispersion (pigment concentration: 20%) | | | | 25% | 25% | 25% | 25% | 25% | 25% | 25% |
| <1> | 1,2-alkane diol | 12HD | HLB: 5.8 | | | | 25% | | | |
| | | 12PD | HLB: 6.5 | | | | | 25% | | |
| | | 12BD | HLB: 7.6 | 25% | 25% | 25% | | | | |

TABLE 3-continued

| | | | | | | | | | | |
|---|---|---|---|---|---|---|---|---|---|---|
| | Solvent (HLB of 8 or less) | DPG | HLB: 4.5 | | | | | | 25% | |
| | | 3MB | HLB: 2.4 | | | | | | | 25% |
| <2> | Surfactant (a1) | TMDDD | HLB: 2.7 | 1% | 1% | 1% | 1% | 1% | 1% | 1% |
| <3> | Surfactant (a2) | TEGO Wet 280 | HLB: 3.5 | | | 1% | 1% | 1% | 1% | 1% |
| | Surfactant (a3) | BYK-333 | HLB: 10.1 | | | | | | | |
| | | TEGO Glide 440 | HLB: 13.5 | 2% | 2.5% | 0.5% | 0.5% | 0.5% | 0.5% | 0.5% |
| | | FZ-77 | HLB: 11.0 | | | | | | | |
| | | KF-640 | HLB: 13.5 | | | | | | | |
| | | Surfactant 3 | HLB: 19.5 | | | | | | | |
| Water | | | | balance | balance | balance | balance | balance | balance | balance |
| Evaluation 1: Solid portion voids | | | | 3 | 3 | 4 | 4 | 4 | 4 | 4 |
| Evaluation 2: Boundary bleeding between colors | | | | 4 | 4 | 4 | 4 | 4 | 4 | 4 |
| Evaluation 3: Aggregation irregularities | | | | 4 | 4 | 4 | 4 | 4 | 4 | 4 |
| Evaluation 4: Dischargeability | | | | 4 | 4 | 4 | 4 | 4 | 4 | 3 |
| Evaluation 5: Drying properties | | | | 4 | 4 | 4 | 4 | 4 | 3 | 4 |
| Evaluation 6: Storage stability | | | | 3 | 2 | 3 | 3 | 3 | 3 | 3 |

<1> Water-soluble organic solvents,
<2> Acetylene-based surfactants,
<3> Polysiloxane-based surfactants

TABLE 4

| | | | | Examples | | | | | | | |
|---|---|---|---|---|---|---|---|---|---|---|---|
| | | | | 31 | 32 | 33 | 34 | 35 | 36 | 37 | 38 |
| Ink | | | | 31 | 32 | 33 | 34 | 35 | 36 | 37 | 38 |
| Pigment dispersion (pigment concentration: 20%) | | | | 25% | 25% | 25% | 25% | 25% | 25% | 25% | 25% |
| <1> | 1,2-alkane diol | 12HD | HLB: 5.8 | | | | 5% | | | | |
| | | 12PD | HLB: 6.5 | | | | | | | 10% | |
| | | 12BD | HLB: 7.6 | | | 15% | 10% | | | | |
| | Solvent (HLB of 8 or less) | DPG | HLB: 4.5 | | | | | 15% | | | 10% |
| | | 3MB | HLB: 2.4 | | | | | | 25% | | |
| | | PGME | HLB: 3.8 | 25% | | 25% | | | 10% | | |
| | | 13BD | HLB: 7.6 | | 25% | | | | | | |
| | Solvent (HLB > 8) | PG | HLB: 8.9 | | | | | 10% | 15% | | |
| | | Diethylene glycol monoisopropyl ether | HLB: 14.2 | | | | 10% | | | 10% | |
| | | Glycerol | HLB: 11.1 | | | | 5% | | | | 10% |
| <2> | Surfactant (a1) | TMDDD | HLB: 2.7 | 1% | 1% | 1% | 1% | 1% | 1% | 1% | 1% |
| | | TMDD | HLB: 3.0 | | | | | | | | |
| | Surfactant (HLB > 3) | Surfynol 440 | HLB: 8.0 | | | | | | | | |
| | | Surfynol 465 | HLB: 13.0 | | | | | | | | |
| <3> | Surfactant (a2) | TEGO Wet 280 | HLB: 3.5 | 1% | 1% | 1% | 1% | 1% | 1% | 1% | 1% |
| | Surfactant (a3) | TEGO Glide 440 | HLB: 13.5 | 0.5% | 0.5% | 0.5% | 0.5% | 0.5% | 0.5% | 0.5% | 0.5% |
| Water | | | | balance | balance | balance | balance | balance | balance | balance | balance |
| Evaluation 1: Solid portion voids | | | | 4 | 4 | 4 | 4 | 4 | 4 | 4 | 4 |
| Evaluation 2: Boundary bleeding between colors | | | | 4 | 4 | 4 | 4 | 4 | 4 | 4 | 4 |
| Evaluation 3: Aggregation irregularities | | | | 4 | 4 | 4 | 4 | 4 | 4 | 4 | 4 |
| Evaluation 4: Dischargeability | | | | 3 | 4 | 4 | 4 | 3 | 3 | 4 | 4 |
| Evaluation 5: Drying properties | | | | 4 | 4 | 4 | 4 | 3 | 4 | 4 | 3 |
| Evaluation 6: Storage stability | | | | 3 | 3 | 3 | 3 | 3 | 3 | 3 | 3 |

| | | | | Examples | | | Comparative Examples | | | |
|---|---|---|---|---|---|---|---|---|---|---|
| | | | | 39 | 40 | 41 | 1 | 2 | 3 | 4 |
| Ink | | | | 39 | 40 | 41 | 42 | 43 | 44 | 45 |
| Pigment dispersion (pigment concentration: 20%) | | | | 25% | 25% | 25% | 25% | 25% | 25% | 25% |
| <1> | 1,2-alkane diol | 12HD | HLB: 5.8 | 5% | | 2% | | | | |
| | | 12PD | HLB: 6.5 | | 2% | | | | | |
| | | 12BD | HLB: 7.6 | | | 10% | 5% | 25% | 25% | 25% |
| | Solvent (HLB of 8 or less) | DPG | HLB: 4.5 | 10% | | | | | | |
| | | 3MB | HLB: 2.4 | | | | | | | |
| | | PGME | HLB: 3.8 | | | | | | | |
| | | 13BD | HLB: 7.6 | | | 20% | | | | |
| | Solvent (HLB > 8) | PG | HLB: 8.9 | | 10% | | 20% | | | |
| | | Diethylene glycol monoisopropyl ether | HLB: 14.2 | | | | | | | |
| | | Glycerol | HLB: 11.1 | 20% | 1% | 10% | | | | |
| <2> | Surfactant (a1) | TMDDD | HLB: 2.7 | | 1% | | 1% | | | |
| | | TMDD | HLB: 3.0 | 0.5% | | 0.5% | | | | |

TABLE 4-continued

| | | | | Examples | | | | | | | |
|---|---|---|---|---|---|---|---|---|---|---|---|
| | | | | 31 | 32 | 33 | 34 | 35 | 36 | 37 | 38 |
| <3> | Surfactant (HLB > 3) | Surfynol 440 | HLB: 8.0 | | | | | | | 1% | |
| | | Surfynol 465 | HLB: 13.0 | | | | | | | | 1% |
| | Surfactant (a2) | TEGO Wet 280 | HLB: 3.5 | | 1% | | | 1% | | | |
| | Surfactant (a3) | TEGO Glide 440 | HLB: 13.5 | 0.5% | | | | | 0.5% | | |
| Water | | | | balance | balance | balance | balance | balance | balance | balance | |
| Evaluation 1: Solid portion voids | | | | 3 | 4 | 2 | 3 | 2 | 1 | 1 | |
| Evaluation 2: Boundary bleeding between colors | | | | 4 | 3 | 2 | 2 | 2 | 2 | 1 | |
| Evaluation 3: Aggregation irregularities | | | | 4 | 3 | 2 | 2 | 1 | 1 | 1 | |
| Evaluation 4: Dischargeability | | | | 4 | 4 | 3 | 1 | 4 | 4 | 4 | |
| Evaluation 5: Drying properties | | | | 4 | 4 | 2 | 4 | 4 | 4 | 4 | |
| Evaluation 6: Storage stability | | | | 3 | 3 | 3 | 1 | 4 | 4 | 4 | |

<1> Water-soluble organic solvents,
<2> Acetylene-based surfactants,
<3> Polysiloxane-based surfactants

TABLE 5

| | | | | Examples | | | | | | | | |
|---|---|---|---|---|---|---|---|---|---|---|---|---|
| | | | | 42 | 43 | 44 | 45 | 46 | 47 | 48 | 49 | 50 |
| Ink | | | | 46 | 47 | 48 | 49 | 50 | 51 | 52 | 53 | 54 |
| Pigment dispersion (pigment concentration: 20%) | | | | 25% | 25% | 25% | 25% | 25% | 25% | 25% | 25% | 25% |
| <1> | 1,2-alkane diol | 12BD | HLB: 7.6 | 25% | 25% | 25% | 25% | 25% | 25% | 25% | 25% | 25% |
| <2> | Surfactant (a1) | TMDDD | HLB: 2.7 | 1% | 1% | 1% | 1% | 1% | 1% | 1% | 1% | 1% |
| <4> | | Binder resin 1 | | 10% | | | | | | | | |
| | | Binder resin 2 | | | 10% | | | | | | | |
| | | Binder resin 3 | | | | 10% | | | | | | |
| | | Binder resin 4 | | | | | 10% | | | | | |
| | | Binder resin 5 | | | | | | 10% | | | | |
| | | Binder resin 6 | | | | | | | 10% | | | |
| | | Binder resin 7 | | | | | | | | 10% | | |
| | | Binder resin 8 | | | | | | | | | 10% | |
| | | Binder resin 9 | | | | | | | | | | 10% |
| | | Binder resin 10 | | | | | | | | | | |
| | | Binder resin 11 | | | | | | | | | | |
| | | Binder resin 12 | | | | | | | | | | |
| | | Binder resin 13 | | | | | | | | | | |
| | | Binder resin 14 | | | | | | | | | | |
| | | Binder resin 15 | | | | | | | | | | |
| | | Binder resin 16 | | | | | | | | | | |
| Water | | | | balance | balance | balance | balance | balance | balance | balance | balance | balance |
| Evaluation 1: Solid portion voids | | | | 3 | 3 | 3 | 3 | 3 | 3 | 3 | 3 | 3 |
| Evaluation 2: Boundary bleeding between colors | | | | 2 | 2 | 2 | 2 | 2 | 2 | 2 | 2 | 2 |
| Evaluation 3: Aggregation irregularities | | | | 2 | 2 | 2 | 2 | 2 | 2 | 2 | 2 | 2 |
| Evaluation 4: Dischargeability | | | | 2 | 2 | 2 | 2+ | 2+ | 2+ | 3 | 3 | 3 |
| Evaluation 5: Drying properties | | | | 3 | 3 | 3 | 2 | 2 | 3 | 3 | 3 | 3 |
| Evaluation 6: Storage stability | | | | 2 | 2 | 2 | 2 | 2 | 2 | 2+ | 2+ | 2+ |
| Evaluation 7: Initial discharge stability | | | | 2 | 2 | 2 | 2 | 2 | 2 | 2 | 2 | 2 |
| Evaluation 8: Alcohol resistance | | | | 2+ | 2+ | 2+ | 2+ | 2+ | 2+ | 2+ | 2+ | 2+ |

| | | | | Examples | | | | | | |
|---|---|---|---|---|---|---|---|---|---|---|
| | | | | 51 | 52 | 53 | 54 | 55 | 56 | 57 |
| | Ink | | | 55 | 56 | 57 | 58 | 59 | 60 | 61 |
| | Pigment dispersion (pigment concentration: 20%) | | | 25% | 25% | 25% | 25% | 25% | 25% | 25% |
| | <1> | 1,2-alkane diol | 12BD | HLB: 7.6 | 25% | 25% | 25% | 25% | 25% | 25% | 25% |
| | <2> | Surfactant (a1) | TMDDD | HLB: 2.7 | 1% | 1% | 1% | 1% | 1% | 1% | 1% |
| | <4> | | Binder resin 1 | | | | | | | | |
| | | | Binder resin 2 | | | | | | | | |
| | | | Binder resin 3 | | | | | | | | |
| | | | Binder resin 4 | | | | | | | | |
| | | | Binder resin 5 | | | | | | | | |
| | | | Binder resin 6 | | | | | | | | |
| | | | Binder resin 7 | | | | | | | | |
| | | | Binder resin 8 | | | | | | | | |

TABLE 5-continued

|  |  | Examples | | | | | | | | |
|---|---|---|---|---|---|---|---|---|---|---|
|  |  | 42 | 43 | 44 | 45 | 46 | 47 | 48 | 49 | 50 |
|  | Binder resin 9 | | | | | | | | | |
|  | Binder resin 10 | | 10% | | | | | | | |
|  | Binder resin 11 | | | 10% | | | | | | |
|  | Binder resin 12 | | | | 10% | | | | | |
|  | Binder resin 13 | | | | | 10% | | | | |
|  | Binder resin 14 | | | | | | 10% | | | |
|  | Binder resin 15 | | | | | | | 10% | | |
|  | Binder resin 16 | | | | | | | | 10% | |
|  | | | | | | | | | | 10% |
| Water | | balance | balance | balance | balance | balance | balance | balance | | |
| Evaluation 1: Solid portion voids | | 3 | 3 | 3 | 3 | 3 | 3 | 3 | | |
| Evaluation 2: Boundary bleeding between colors | | 2 | 2 | 2 | 2 | 2 | 2 | 2 | | |
| Evaluation 3: Aggregation irregularities | | 2 | 2 | 2 | 2 | 2 | 2 | 2 | | |
| Evaluation 4: Dischargeability | | 2+ | 2+ | 2+ | 2+ | 2+ | 2+ | 2 | | |
| Evaluation 5: Drying properties | | 3 | 3 | 3 | 3 | 3 | 3 | 3 | | |
| Evaluation 6: Storage stability | | 2 | 3 | 4 | 4 | 4 | 4 | 4 | | |
| Evaluation 7: Initial discharge stability | | 2 | 2+ | 2+ | 2+ | 2+ | 2 | 2+ | | |
| Evaluation 8: Alcohol resistance | | 2+ | 3 | 4 | 4 | 4 | 3 | 3 | | |

<1> Water-soluble organic solvents,
<2> Acetylene-based surfactants,
<4> Binder resin aqueous solutions

TABLE 6

|  |  |  |  | Examples | | | | | | | | |
|---|---|---|---|---|---|---|---|---|---|---|---|---|
|  |  |  |  | 58 | 59 | 60 | 61 | 62 | 63 | 64 | 65 | 66 |
| Ink |  |  |  | 62 | 63 | 64 | 65 | 66 | 67 | 68 | 69 | 70 |
| Pigment dispersion (pigment concentration: 20%) |  |  |  | 25% | 25% | 25% | 25% | 25% | 25% | 25% | 25% | 25% |
| <1> | 1,2-alkane diol | 12HD | HLB: 5.8 | | | | | | | | | |
|  |  | 12BD | HLB: 7.6 | 25% | 25% | 25% | 25% | 25% | 25% | 25% | 25% | 25% |
|  | Solvent (HLB of 8 or less) | PGME | HLB: 3.8 | | | | | | | | | |
|  | Solvent (HLB > 8) | PG | HLB: 8.9 | | | | | | | | | |
| <2> | Surfactant (a1) | TMDDD | HLB: 2.7 | 1% | 1% | 1% | 1% | 1% | 1% | 1% | 1% | 1% |
| <3> | Surfactant (a2) | TEGO Wet 280 | HLB: 3.5 | | | | | | | 1% | 1% | 1% |
| <4> | Binder resin 5 | | | | | | | | | 10% | | |
|  | Binder resin 13 | | | | | | | | | | 10% | |
|  | Binder resin 17 | | | 10% | | | | | | | | |
|  | Binder resin 18 | | | | 10% | | | | | | | |
|  | Binder resin 19 | | | | | 10% | | | | | | |
|  | Binder resin 20 | | | | | | 10% | | | | | |
|  | Binder resin 21 | | | | | | | | | | | 10% |
|  | Binder resin 22 | | | | | | | | | | | |
|  | Binder resin 23 | | | | | | | | | | | |
|  | Binder resin 24 | | | | | | | | | | | |
|  | Binder resin 25 | | | | | | | | | | | |
|  | Binder resin 26 | | | | | | | | 10% | | | |
|  | Binder resin 27 | | | | | | | 10% | | | | |
| Water |  |  |  | balance | balance | balance | balance | balance | balance | balance | balance | balance |
| Evaluation 1: Solid portion voids |  |  |  | 3 | 3 | 3 | 3 | 2 | 3 | 4 | 4 | 4 |
| Evaluation 2: Boundary bleeding between colors |  |  |  | 2 | 2 | 2 | 2 | 2 | 2 | 3 | 3 | 3 |
| Evaluation 3: Aggregation irregularities |  |  |  | 2 | 2 | 2 | 2 | 2 | 2 | 3 | 3 | 3 |
| Evaluation 4: Dischargeability |  |  |  | 3 | 3 | 3 | 3 | 2 | 3 | 4 | 3 | 4 |
| Evaluation 5: Drying properties |  |  |  | 3 | 3 | 3 | 3 | 2 | 3 | 3 | 4 | 4 |
| Evaluation 6: Storage stability |  |  |  | 4 | 4 | 4 | 4 | 3 | 4 | 2+ | 3 | 4 |
| Evaluation 7: Initial discharge stability |  |  |  | 3 | 3 | 3 | 3 | 2 | 3 | 2+ | 2+ | 3 |
| Evaluation 8: Alcohol resistance |  |  |  | 4 | 4 | 3 | 4 | 4 | 3 | 3 | 4 | 4 |

|  |  |  |  | Examples | | | | | | |
|---|---|---|---|---|---|---|---|---|---|---|
|  |  |  |  | 67 | 68 | 69 | 70 | 71 | 72 | 73 |
| Ink |  |  |  | 71 | 72 | 73 | 74 | 75 | 76 | 77 |
| Pigment dispersion (pigment concentration: 20%) |  |  |  | 25% | 25% | 25% | 25% | 25% | 25% | 25% |
| <1> | 1,2-alkane diol | 12HD | HLB: 5.8 | | | | | 5% | 5% | |
|  |  | 12BD | HLB: 7.6 | 25% | 25% | 25% | 25% | 20% | 10% | |

TABLE 6-continued

|  |  |  |  |  |  |  |  |  |  |  |
|---|---|---|---|---|---|---|---|---|---|---|
|  |  | Solvent (HLB of 8 or less) | PGME | HLB: 3.8 |  |  |  |  |  |  | 10% |
|  |  | Solvent (HLB > 8) | PG | HLB: 8.9 |  |  |  |  |  | 10% | 15% |
|  | <2> | Surfactant (a1) | TMDDD | HLB: 2.7 | 1% | 1% | 1% | 1% | 1% | 1% | 1% |
|  | <3> | Surfactant (a2) | TEGO Wet 280 | HLB: 3.5 | 1% | 1% | 1% | 1% | 1% | 1% | 1% |
|  | <4> |  | Binder resin 5 |  |  |  |  |  |  |  |  |
|  |  |  | Binder resin 13 |  |  |  |  |  |  |  |  |
|  |  |  | Binder resin 17 |  |  |  |  |  |  |  |  |
|  |  |  | Binder resin 18 |  |  |  |  |  |  |  |  |
|  |  |  | Binder resin 19 |  |  |  |  |  |  |  |  |
|  |  |  | Binder resin 20 |  |  |  |  |  |  |  |  |
|  |  |  | Binder resin 21 |  |  |  |  |  |  |  |  |
|  |  |  | Binder resin 22 |  | 10% |  |  |  |  |  |  |
|  |  |  | Binder resin 23 |  |  | 10% |  |  |  |  |  |
|  |  |  | Binder resin 24 |  |  |  | 10% |  | 10% | 10% | 10% |
|  |  |  | Binder resin 25 |  |  |  |  | 10% |  |  |  |
|  |  |  | Binder resin 26 |  |  |  |  |  |  |  |  |
|  |  |  | Binder resin 27 |  |  |  |  |  |  |  |  |
| Water |  |  |  |  | balance | balance | balance | balance | balance | balance | balance |
| Evaluation 1: Solid portion voids |  |  |  |  | 4 | 4 | 4 | 4 | 4 | 4 | 3 |
| Evaluation 2: Boundary bleeding between colors |  |  |  |  | 3 | 3 | 3 | 3 | 3 | 4 | 4 |
| Evaluation 3: Aggregation irregularities |  |  |  |  | 3 | 3 | 3 | 3 | 3 | 3 | 4 |
| Evaluation 4: Dischargeability |  |  |  |  | 4 | 2+ | 4 | 4 | 4 | 4 | 3 |
| Evaluation 5: Drying properties |  |  |  |  | 3 | 4 | 4 | 2 | 4 | 4 | 4 |
| Evaluation 6: Storage stability |  |  |  |  | 2 | 3 | 4 | 4 | 4 | 4 | 4 |
| Evaluation 7: Initial discharge stability |  |  |  |  | 3 | 2 | 4 | 4 | 4 | 4 | 3 |
| Evaluation 8: Alcohol resistance |  |  |  |  | 2 | 4 | 4 | 3 | 4 | 4 | 4 |

<1> Water-soluble organic solvents,
<2> Acetylene-based surfactants,
<3> Polysiloxane-based surfactants,
<4> Binder resin aqueous solutions

TABLE 7

|  |  |  |  |  | Examples |  |  |  |  |  |  |  |  |
|---|---|---|---|---|---|---|---|---|---|---|---|---|---|
|  |  |  |  |  | 74 | 75 | 76 | 77 | 78 | 79 | 80 | 81 | 82 |
| Ink |  |  |  |  | 78 | 79 | 80 | 81 | 82 | 83 | 84 | 85 | 86 |
| Pigment dispersion (pigment concentration: 20%) |  |  |  |  | 25% | 25% | 25% | 25% | 25% | 25% | 25% | 25% | 25% |
| <1> | 1,2-alkanediol | 12BD |  | HLB: 7.6 | 25% | 25% | 25% | 25% | 25% | 25% | 25% | 25% | 25% |
| <2> | Surfactant (a1) | TMDDD |  | HLB: 2.7 | 1% | 1% | 1% | 1% | 1% | 1% | 1% | 1% | 1% |
| <3> | Surfactant (a2) | TEGO Wet 280 |  | HLB: 3.5 | 1% | 1% | 1% | 1% | 1% | 1% | 1% | 1% | 1% |
|  | Surfactant (a3) | TEGO Glide 440 |  | HLB: 13.5 | 0.5% | 0.5% | 0.5% | 0.5% | 0.5% | 0.5% | 0.5% | 0.5% | 0.5% |
| <4> |  | Binder resin 1 |  |  | 10% |  |  |  |  |  |  |  |  |
|  |  | Binder resin 2 |  |  |  | 10% |  |  |  |  |  |  |  |
|  |  | Binder resin 5 |  |  |  |  | 10% |  | 0.5% | 1% | 2% | 20% | 30% |
|  |  | Binder resin 8 |  |  |  |  |  | 10% |  |  |  |  |  |
| Water |  |  |  |  | balance | balance | balance | balance | balance | balance | balance | balance | balance |
| Evaluation 1: Solid portion voids |  |  |  |  | 4 | 4 | 4 | 4 | 4 | 4 | 4 | 4 | 3 |
| Evaluation 2: Boundary bleeding between colors |  |  |  |  | 4 | 4 | 4 | 4 | 4 | 4 | 4 | 4 | 4 |
| Evaluation 3: Aggregation irregularities |  |  |  |  | 4 | 4 | 4 | 4 | 4 | 4 | 4 | 4 | 4 |
| Evaluation 4: Dischargeability |  |  |  |  | 4 | 4 | 4 | 4 | 4 | 4 | 4 | 4 | 3 |
| Evaluation 5: Drying properties |  |  |  |  | 4 | 4 | 4 | 4 | 4 | 4 | 4 | 4 | 4 |
| Evaluation 6: Storage stability |  |  |  |  | 3 | 3 | 4 | 4 | 3 | 4 | 4 | 4 | 4 |
| Evaluation 7: Initial discharge stability |  |  |  |  | 2 | 2 | 2+ | 2+ | 3 | 3 | 3 | 2+ | 2 |
| Evaluation 8: Alcohol resistance |  |  |  |  | 2+ | 2+ | 3 | 2+ | 2 | 2+ | 2+ | 3 | 4 |

<1> Water-soluble organic solvents,
<2> Acetylene-based surfactants,
<3> Polysiloxane-based surfactants,
<4> Binder resin aqueous solutions As shown in Tables 1 to 4, Examples 1 to 41 relate to embodiments that contain a water-soluble organic solvent having an HLB value of 8 or less in an amount of 10% by weight to 50% by weight relative to the total weight of the water-based inkjet ink, and also contain an acetylenediol-based surfactant (a1) having an HLB value of 3 or less, and consequently correspond with embodiments of the present invention. In these embodiments, the levels of voids, color boundary bleeding and aggregation irregularities in the printed items, and the dischargeability, drying properties and storage stability of the ink were all within practically usable ranges.

In contrast, Comparative Example 1 represents an embodiment in which the amount of the water-soluble organic solvent having an HLB value of 8 or less was less than 10% by weight. In Comparative Example 1, by using 2,5,8,11-tetramethyl-6-dodecyne-5,8-diol as the acetylenediol-based surfactant (a1) having an HLB value of 3 or less, the levels of voids in the solid printed portions and the aggregation irregularities and the like in the printed items were within practically usable ranges. However, the results for the dischargeability and storage stability of the ink were poor. It is thought that this is because the amount of the 1,2-butanediol that represents the solvent having an HLB value of 8 or less was small, resulting in unsatisfactory compatibility of the above surfactant with the ink.

The Comparative Example 2 represents a system in which the acetylenediol-based surfactant (a1) having an HLB value of 3 or less was not used, but a polysiloxane-based surfactant (a2) having an HLB value of 4 or less and a polysiloxane-based surfactant (a3) having an HLB value of at least 8 but not more than 20 were used, but aggregation irregularities were observed in the printed items.

Comparative Examples 3 and 4 represent systems in which an acetylenediol-based surfactant having an HLB value greater than 3 was used instead of the acetylenediol-based surfactant (a1) having an HLB value of 3 or less, but color boundary bleeding, aggregation irregularities and voids within the solid printed portions were observed in the printed items.

As shown in Tables 5 to 7, Examples 42 to 82 relate to embodiments which, in addition to the water-soluble organic solvent having an HLB value of 8 or less and the acetylenediol-based surfactant (a1) having an HLB value of 3 or less, also contained a water-soluble resin as a binder resin. The acid values of the water-soluble resins used as the binder resin were within a range from 4 to 78 mgKOH/g. Further, in addition to having a hydrophobic unit containing an alkyl group, the water-soluble resins each had a weight average molecular weight of at least 6,000 but not more than 26,000, and a molecular weight distribution width of 1.3 to 2.3. In these embodiments, it was confirmed that in addition to the favorable printing quality achieved in Examples 1 to 41, practically usable levels of initial discharge stability and alcohol resistance (coating film durability) were also obtained.

Among these examples, Examples 64 to 73 represent embodiments which, in addition to the acetylenediol-based surfactant (a1) having an HLB value of 3 or less, also contained a polysiloxane-based surfactant (a2) having an HLB value of 4 or less as a surfactant, and which also contained a specific water-soluble resin as the binder resin. The water-soluble resins used in these embodiments not only had a hydrophobic unit containing an alkyl group of at least 10 carbon atoms, but also had an acid value of 20 to 65 mgKOH/g. Further, these water-soluble resins had a weight average molecular weight of at least 6,000 but not more than 26,000, and a molecular weight distribution width of 1.3 to 2.2. In particular, the water-soluble resins used in Examples 66, 69, 71, 72 and 73 had a hydrophobic unit containing an alkyl group of at least 10 carbon atoms, and also had an acid value of 20 to 33 mgKOH/g. Further, these water-soluble resins had a weight average molecular weight of about 18,000 and a molecular weight distribution width of 1.3 to 1.5. In these embodiments, all of the evaluation results were "3" or greater, confirming that extremely superior evaluation results were obtainable for all of the various evaluated properties.

Furthermore, Examples 74 to 82 represent embodiments which, in addition to the acetylenediol-based surfactant (a1) having an HLB value of 3 or less, also contained a combination of a polysiloxane-based surfactant (a2) having an HLB value of 4 or less and a polysiloxane-based surfactant (a3) having an HLB value of 8 to 20 as surfactants, and which also contained a water-soluble resin having a hydrophobic unit containing an alkyl group. The water-soluble resins used in these embodiments had an acid value of 65 mgKOH/g, a weight average molecular weight of at least 12,000 but not more than 18,000, and a molecular weight distribution width of 2.2 to 2.3. In particular, the water-soluble resins used in Examples 76, 77, 79, 80 and 81 had a hydrophobic unit containing an alkyl group of at least 12 carbon atoms, and also had a weight average molecular weight of at least 15,000 but not more than 18,000. In these embodiments, extremely superior results were obtained, with an evaluation result of "4" achieved for all of the evaluation items, namely voids, color boundary bleeding and aggregation irregularities in the printed items, and dischargeability, drying properties and storage stability of the ink. Moreover, the initial discharge stability and alcohol resistance were also confirmed as being within practically usable ranges.

As described above, the water-based inkjet ink of the present invention enables images of high image quality to be formed by printing on low-absorption substrate such as coated papers. Further, the ink also exhibits excellent discharge stability and storage stability. Accordingly, the water-based inkjet ink of the present invention can be used favorably for performing inkjet printing using low-absorption substrates at the types of high speeds and high recording resolutions ideal for commercial printing.

The invention claimed is:

1. A water-based inkjet ink comprising at least a pigment, a water-soluble organic solvent and a surfactant (A), wherein
   the water-soluble organic solvent is a water-soluble organic solvent having an HLB value determined by Griffin's method of 8 or less, which is included in an amount within a range from 10% by weight to 50% by weight relative to a total weight of the water-based inkjet ink, and
   the surfactant (A) comprises an acetylenediol-based surfactant (a1) having an HLB value determined by Griffin's method of 3 or less, wherein an amount of the acetylenediol-based surfactant (a1) having an HLB value of 3 or less is within a range from 0.25% by weight to 5.0% by weight relative to a total weight of the water-based inkjet ink.

2. The water-based inkjet ink according to claim 1, wherein the surfactant (A) also comprises a polysiloxane-based surfactant (a2) having an HLB value determined by Griffin's method of 4 or less.

3. The water-based inkjet ink according to claim 1, wherein the surfactant (A) also comprises a polysiloxane-based surfactant (a3) having an HLB value determined by Griffin's method of at least 8 but not more than 20.

4. The water-based inkjet ink according to claim 3, wherein the polysiloxane-based surfactant (a3) having an HLB value determined by Griffin's method of at least 8 but not more than 20 comprises a compound represented by a formula shown below:

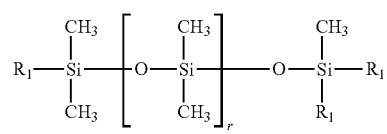

wherein r represents an integer of 1 to 80, and $R_1$ is a group represented by a formula shown below:

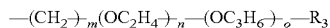

wherein m represents an integer of 1 to 6, n represents an integer of 0 to 50, o represents an integer of 0 to 50, n+o is an integer of 1 or greater, and $R_3$ represents a hydrogen atom, an alkyl group of 1 to 6 carbon atoms, or a (meth)acrylic group.

5. The water-based inkjet ink according to claim 2, wherein a ratio between an amount of the polysiloxane-based surfactant (a2) having an HLB value of 4 or less and an amount of the acetylenediol-based surfactant (a1) having an HLB value of 3 or less is from 0.1:1.0 to 4.0:1.0.

6. The water-based inkjet ink according to claim 3, wherein a ratio between an amount of the polysiloxane-based surfactant (a3) having an HLB value of at least 8 but not more than 20 and an amount of the acetylenediol-based surfactant (a1) having an HLB value of 3 or less is from 0.05:1.0 to 2.5:1.0.

7. The water-based inkjet ink according to claim 1, wherein the water-soluble organic solvent having an HLB value of 8 or less comprises a polyol-based solvent.

8. The water-based inkjet ink according to claim 1, further comprising a water-soluble resin having an acid value of 1 to 80 mgKOH/g.

9. The water-based inkjet ink according to claim 8, wherein an amount of the water-soluble resin is within a range from 0.25% by weight to 15% by weight relative to a total weight of the water-based inkjet ink.

10. A printed item having a printing substrate, and a coating film formed using the water-based inkjet ink according to claim 1 formed on the printing substrate.

* * * * *